US012638355B2

(12) United States Patent
Moreno et al.

(10) Patent No.: US 12,638,355 B2
(45) Date of Patent: *May 26, 2026

(54) OUTER HOUSING WITH A SIDEWALL SHELL AND CAP ATTACHED THERETO FOR A PRESSURE MONITORING SYSTEM

(71) Applicant: Mueller International, LLC, Atlanta, GA (US)

(72) Inventors: Carlos Stephen Moreno, Chattanooga, TN (US); Timothy J. Mitchell, Hixson, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,204

(22) Filed: Mar. 28, 2024

(65) Prior Publication Data

US 2024/0264025 A1    Aug. 8, 2024

Related U.S. Application Data

(63) Continuation of application No. 17/702,622, filed on Mar. 23, 2022, now Pat. No. 11,971,318, which is a
(Continued)

(51) Int. Cl.
*G01L 19/14* (2006.01)
*E03B 9/02* (2006.01)
*G01L 19/00* (2006.01)

(52) U.S. Cl.
CPC ........ *G01L 19/141* (2013.01); *G01L 19/0084* (2013.01); *E03B 9/02* (2013.01)

(58) Field of Classification Search
CPC . G12B 9/04; G01F 15/14; G01F 15/18; E03B 7/075; E03B 9/06; G01M 3/3272;
(Continued)

(56) References Cited

U.S. PATENT DOCUMENTS 3,683,102 A * 8/1972 Moran ................... G01R 11/04
324/156
3,692,042 A 9/1972 Dashner
(Continued)

FOREIGN PATENT DOCUMENTS

DE         67740      3/1983
FR       2792070     10/2000
(Continued)

OTHER PUBLICATIONS

Moreno, Carlos Stephen; Corrected Notice of Allowance for U.S. Appl. No. 16/252,099, filed Jan. 18, 2019, mailed May 5, 2021, 10 pgs.
(Continued)

*Primary Examiner* — Tran M. Tran
(74) *Attorney, Agent, or Firm* — Smith, Gambrell & Russell LLP

(57) ABSTRACT

An outer housing for a pressure monitoring system includes a sidewall shell defining an outer shell surface and a top end, the sidewall shell comprising an annular outer sidewall projection extending from the top end, the outer sidewall projection defining at least a portion of the outer shell surface; and a cap mounted to the sidewall shell, the cap defining an inner cap surface and an annular outer cap surface opposite the inner cap surface, the outer sidewall projection extending alongside the outer cap surface; wherein the outer cap surface defines a cap curved portion and the outer sidewall projection defines a projection curved portion meeting the cap curved portion, such that the cap is substantially flush with the sidewall shell.

8 Claims, 11 Drawing Sheets

Related U.S. Application Data continuation of application No. 16/399,109, filed on Apr. 30, 2019, now Pat. No. 11,313,748, which is a continuation-in-part of application No. 16/252,099, filed on Jan. 18, 2019, now Pat. No. 11,067,464.

(58) Field of Classification Search
CPC .. G01L 19/003; G01L 19/0084; G01L 19/141
USPC .......................................................... 73/273
See application file for complete search history.

(56) References Cited

U.S. PATENT DOCUMENTS

| | | | | |
|---|---|---|---|---|
| 3,913,400 | A | * | 10/1975 | Floren ..................... G01F 15/14 |
| | | | | 73/431 |
| 3,921,449 | A | * | 11/1975 | Hauffe .................... G01F 15/14 |
| | | | | 49/35 |
| 4,000,753 | A | | 1/1977 | Ellis |
| 4,037,748 | A | * | 7/1977 | Stubbs, Jr. ......... B65D 43/0256 |
| | | | | 215/256 |
| 4,065,020 | A | * | 12/1977 | Carson ..................... H02B 1/46 |
| | | | | 220/293 |
| 4,083,377 | A | | 4/1978 | Luckenbill |
| 4,111,329 | A | * | 9/1978 | Lampman .......... B65D 43/0256 |
| | | | | 206/508 |
| 4,128,006 | A | | 12/1978 | Grabow |
| 4,153,176 | A | * | 5/1979 | Carson ..................... H02B 1/06 |
| | | | | 220/293 |
| 4,182,361 | A | | 1/1980 | Oakey |
| 4,409,848 | A | * | 10/1983 | Lutz ...................... G01F 15/063 |
| | | | | 73/273 |
| 4,598,583 | A | * | 7/1986 | Steinhauser .......... G01F 1/0755 |
| | | | | 73/273 |
| 4,653,330 | A | | 3/1987 | Hedtke |
| 4,727,900 | A | | 3/1988 | Dooling et al. |
| 4,770,203 | A | | 9/1988 | Laurel |
| 4,811,600 | A | * | 3/1989 | Robitaille ............. G01F 15/007 |
| | | | | 73/431 |
| 4,813,882 | A | * | 3/1989 | Ruiz ..................... H01R 33/765 |
| | | | | 439/101 |
| 4,899,586 | A | | 2/1990 | Koneval et al. |
| 5,072,750 | A | | 12/1991 | Poms et al. |
| 5,137,535 | A | | 8/1992 | Keller |
| 5,291,919 | A | | 3/1994 | Calzavara |
| 5,303,583 | A | | 4/1994 | Harris |
| 5,365,785 | A | * | 11/1994 | Martin ..................... G01F 15/14 |
| | | | | 73/431 |
| 5,383,495 | A | * | 1/1995 | Kennedy ................... E03B 9/06 |
| | | | | 138/96 T |
| 5,416,475 | A | * | 5/1995 | Tolbert ................. G01F 15/066 |
| | | | | 73/431 |
| 5,473,504 | A | * | 12/1995 | Horan ...................... H02B 1/03 |
| | | | | 324/156 |
| 5,503,271 | A | * | 4/1996 | Lynch .................... B65D 85/38 |
| | | | | 73/431 |
| 5,519,184 | A | | 5/1996 | Umlas |
| 5,596,893 | A | | 1/1997 | Stehling et al. |
| 5,722,450 | A | | 3/1998 | Julicher |
| 5,779,074 | A | | 7/1998 | Burns |
| 5,823,023 | A | | 10/1998 | Benda |
| 5,966,010 | A | * | 10/1999 | Loy ........................ G01R 11/04 |
| | | | | 324/141 |
| 5,996,419 | A | | 12/1999 | Sokn |
| 6,058,957 | A | | 5/2000 | Honigsbaum |
| 6,102,444 | A | | 8/2000 | Kozey |
| 6,453,247 | B1 | | 9/2002 | Hunaidi |
| 6,522,124 | B1 | * | 2/2003 | Ballard ................ G01R 22/065 |
| | | | | 324/156 |
| 6,647,762 | B1 | | 11/2003 | Roy |
| RE38,348 | E | | 12/2003 | Bloss, Jr. et al. |
| 6,672,170 | B1 | | 1/2004 | Dipaola |
| 6,745,633 | B2 | * | 6/2004 | Sasaki ................... G01L 19/143 |
| | | | | 73/727 |

| | | | | |
|---|---|---|---|---|
| 6,763,724 | B2 | * | 7/2004 | DiPaola ................ G01L 19/148 |
| | | | | 73/717 |
| 6,802,338 | B1 | | 10/2004 | Istre, Jr. |
| 6,816,072 | B2 | | 11/2004 | Zoratti |
| 6,848,303 | B2 | * | 2/2005 | Oeder ........................ G01F 1/10 |
| | | | | 73/273 |
| 6,911,648 | B2 | | 6/2005 | Wu et al. |
| 6,986,285 | B2 | | 1/2006 | Avisse |
| 7,107,856 | B2 | | 9/2006 | Kopp |
| 7,231,968 | B2 | | 6/2007 | Owens |
| 7,251,985 | B2 | | 8/2007 | Renk et al. |
| 7,425,209 | B2 | | 9/2008 | Fowles et al. |
| 7,475,596 | B2 | | 1/2009 | Hunaidi et al. |
| 7,523,666 | B2 | | 4/2009 | Thompson et al. |
| 7,568,834 | B2 | * | 8/2009 | Seki ........................ G01L 19/16 |
| | | | | 374/208 |
| 7,597,113 | B2 | | 10/2009 | Garcia et al. |
| 7,637,019 | B2 | | 12/2009 | Brandl |
| 7,656,649 | B2 | | 2/2010 | Loy et al. |
| 7,692,600 | B1 | | 4/2010 | Pakosz et al. |
| 7,819,016 | B2 | | 10/2010 | Chen |
| 7,821,776 | B2 | | 10/2010 | Loy et al. |
| 7,983,869 | B1 | | 7/2011 | Hurley |
| 8,024,986 | B2 | * | 9/2011 | Pettit ...................... G01K 13/02 |
| | | | | 73/866.5 |
| 8,227,692 | B2 | * | 7/2012 | Dahlgren ............... H05K 5/061 |
| | | | | 361/666 |
| 8,346,492 | B2 | | 1/2013 | Yang et al. |
| 8,362,919 | B2 | | 1/2013 | Cooper et al. |
| 8,401,811 | B1 | | 3/2013 | Hurley |
| 8,589,092 | B2 | | 11/2013 | Plouffe et al. |
| 8,664,939 | B2 | * | 3/2014 | Therrien ................. G01F 15/14 |
| | | | | 324/156 |
| 8,665,101 | B2 | | 3/2014 | Solomon |
| 8,674,830 | B2 | | 3/2014 | Lanham et al. |
| 8,717,183 | B2 | | 5/2014 | Pal et al. |
| 8,770,220 | B1 | | 7/2014 | Embry |
| 8,776,593 | B2 | | 7/2014 | Margalit et al. |
| 8,823,509 | B2 | | 9/2014 | Hyland et al. |
| 8,931,505 | B2 | | 1/2015 | Hyland et al. |
| 8,942,947 | B1 | | 1/2015 | Hurley |
| 9,291,520 | B2 | | 3/2016 | Fleury, Jr. et al. |
| 9,310,229 | B2 | | 4/2016 | Herderich et al. |
| 9,315,973 | B2 | | 4/2016 | Varman et al. |
| 9,388,554 | B2 | | 7/2016 | Bost |
| 9,458,609 | B2 | | 10/2016 | Fleury, Jr. et al. |
| 9,496,943 | B2 | | 11/2016 | Parish et al. |
| 9,525,202 | B2 | | 12/2016 | Podduturi |
| 9,528,903 | B2 | | 12/2016 | Zusman |
| 9,560,779 | B2 | | 1/2017 | Novysedlak et al. |
| 9,576,754 | B2 | | 2/2017 | Arnst et al. |
| 9,587,763 | B2 | | 3/2017 | Stehling et al. |
| 9,593,999 | B2 | | 3/2017 | Fleury |
| 9,624,653 | B2 | | 4/2017 | Clark |
| 9,670,650 | B2 | | 6/2017 | Pinney et al. |
| 9,708,798 | B2 | | 7/2017 | Huelsman et al. |
| 9,772,250 | B2 | | 9/2017 | Richarz et al. |
| 9,784,634 | B2 | * | 10/2017 | Yamada ................... G01B 7/18 |
| 9,849,322 | B2 | | 12/2017 | Hyland et al. |
| 9,861,848 | B2 | | 1/2018 | Hyland et al. |
| 9,873,008 | B2 | | 1/2018 | Silvers et al. |
| 9,901,765 | B2 | | 2/2018 | Silvers et al. |
| 9,933,329 | B2 | | 4/2018 | Hansen et al. |
| 9,983,092 | B2 | | 5/2018 | Howitt |
| 10,107,435 | B2 | | 10/2018 | Horimoto |
| 10,145,749 | B2 | * | 12/2018 | Abe ...................... G01L 9/0041 |
| 10,175,135 | B2 | | 1/2019 | Dintakurt et al. |
| 10,180,414 | B2 | | 1/2019 | Clark et al. |
| 10,246,320 | B2 | | 4/2019 | Do et al. |
| 10,283,857 | B2 | | 5/2019 | Ortiz et al. |
| 10,305,178 | B2 | | 5/2019 | Gibson et al. |
| 10,317,384 | B2 | | 6/2019 | Morrow et al. |
| 10,386,257 | B2 | | 8/2019 | Fleury, Jr. et al. |
| 10,393,553 | B2 | | 8/2019 | Kareco et al. |
| 10,444,033 | B2 | | 10/2019 | Maman et al. |
| 10,480,679 | B2 | | 11/2019 | Stadler |
| 10,557,772 | B2 | | 2/2020 | Hansen et al. |
| 10,560,764 | B2 | | 2/2020 | Solomon et al. |
| 10,591,323 | B1 | | 3/2020 | Cavacuiti et al. |

(56) References Cited

U.S. PATENT DOCUMENTS

| | | | | |
|---|---|---|---|---|
| 10,612,216 | B2 | 4/2020 | Kennedy | |
| 10,670,484 | B2 | 6/2020 | Pusheck | |
| 10,670,485 | B2 | 6/2020 | Pusheck | |
| 10,845,264 | B2 * | 11/2020 | Kim | G01L 19/06 |
| 10,881,888 | B2 | 1/2021 | Hyland et al. | |
| 11,067,464 | B2 | 7/2021 | Moreno et al. | |
| 11,313,748 | B2 | 4/2022 | Moreno et al. | |
| 11,336,004 | B2 | 5/2022 | Gibson et al. | |
| 11,382,227 | B2 | 7/2022 | Nelson, III | |
| 11,408,789 | B2 | 8/2022 | Rech et al. | |
| 11,415,453 | B1 | 8/2022 | Susko et al. | |
| 11,630,021 | B2 | 4/2023 | Fleury, Jr. et al. | |
| 11,698,314 | B2 | 7/2023 | Krywyj et al. | |
| 11,729,931 | B2 | 8/2023 | Nelson, III | |
| 11,754,456 | B2 | 9/2023 | Moreno et al. | |
| 11,971,318 | B2 | 4/2024 | Moreno et al. | |
| 12,529,616 | B2 | 1/2026 | Moreno et al. | |
| 2001/0009059 | A1 * | 7/2001 | Chiku | G01L 19/0084 |
| | | | | 264/328.12 |
| 2003/0193193 | A1 | 10/2003 | Harrington et al. | |
| 2004/0201215 | A1 | 10/2004 | Steingass | |
| 2006/0284784 | A1 | 12/2006 | Smith et al. | |
| 2007/0044552 | A1 | 3/2007 | Huang | |
| 2007/0085750 | A1 | 4/2007 | De Angelis | |
| 2008/0129536 | A1 | 6/2008 | Randall et al. | |
| 2011/0107845 | A1 * | 5/2011 | Gabriel | B29C 66/322 |
| | | | | 73/861.11 |
| 2011/0197975 | A1 | 8/2011 | Stiatti et al. | |
| 2011/0252655 | A1 | 10/2011 | Cline | |
| 2012/0004866 | A1 | 1/2012 | Plouffe et al. | |
| 2015/0128714 | A1 | 5/2015 | Moss | |
| 2015/0355045 | A1 | 12/2015 | Solomon et al. | |
| 2016/0013565 | A1 | 1/2016 | Ortiz | |
| 2016/0356755 | A1 | 12/2016 | Gifford | |
| 2017/0082592 | A1 | 3/2017 | Morrow et al. | |
| 2017/0130431 | A1 | 5/2017 | Pinney et al. | |
| 2017/0237158 | A1 | 8/2017 | Gibson | |
| 2017/0248449 | A1 | 8/2017 | Kareco et al. | |
| 2017/0268954 | A1 | 9/2017 | Ocalan | |
| 2017/0370893 | A1 | 12/2017 | West | |
| 2019/0353506 | A1 | 11/2019 | Yoda | |
| 2020/0025597 | A1 | 1/2020 | Staton et al. | |
| 2020/0054911 | A1 | 2/2020 | Barkay | |
| 2020/0232863 | A1 | 7/2020 | Moreno et al. | |
| 2020/0232864 | A1 | 7/2020 | Moreno et al. | |
| 2021/0318195 | A1 | 10/2021 | Moreno et al. | |
| 2022/0236132 | A1 | 7/2022 | Moreno et al. | |
| 2022/0369233 | A1 | 11/2022 | Bohrer | |
| 2023/0140627 | A1 | 5/2023 | Simonsen | |
| 2023/0375426 | A1 | 11/2023 | Moreno et al. | |
| 2024/0288295 | A1 * | 8/2024 | Sabraoui | G01F 15/14 |
| 2025/0085149 | A1 | 3/2025 | Goh et al. | |

FOREIGN PATENT DOCUMENTS

| | | |
|---|---|---|
| WO | 2012000088 | 1/2012 |
| WO | 2013025526 | 2/2013 |
| WO | 2013038404 | 3/2013 |

OTHER PUBLICATIONS

Moreno, Carlos Stephen; Corrected Notice of Allowance for U.S. Appl. No. 16/252,099, filed Jan. 18, 2019, mailed Jun. 21, 2021, 6 pgs.

Moreno, Carlos Stephen; Non-Final Office Action for U.S. Appl. No. 16/252,099, filed Jan. 18, 2019, mailed Dec. 31, 2020, 21 pgs.

Moreno, Carlos Stephen; Notice of Allowance for U.S. Appl. No. 16/252,099, filed Jan. 18, 2019, mailed Mar. 19, 2021, 14 pgs.

Moreno, Carlos Stephen; Non-Final Office Action for U.S. Appl. No. 17/358,155, filed Jun. 25, 2021, mailed Dec. 13, 2022, 41 pgs.

Moreno, Carlos Stephen; Notice of Allowance for U.S. Appl. No. 17/358,155, filed Jun. 25, 2021, mailed May 31, 2023, 18 pgs.

Moreno, Carlos Stephen; Final Office Action for U.S. Appl. No. 16/399,109, filed Apr. 30, 2019, mailed Mar. 22, 2021, 21 pgs.

Moreno, Carlos Stephen; Final Office Action for U.S. Appl. No. 16/399,109, filed Apr. 30, 2019, mailed Sep. 15, 2021, 15 pgs.

Moreno, Carlos Stephen; Non-Final Office Action for U.S. Appl. No. 16/399,109, filed Apr. 30, 2019, mailed Dec. 31, 2020, 18 pgs.

Moreno, Carlos Stephen; Non-Final Office Action for U.S. Appl. No. 16/399,109, filed Apr. 30, 2019, mailed Jun. 14, 2021, 18 pgs.

Moreno, Carlos Stephen; Notice of Allowance for U.S. Appl. No. 16/399,109, filed Apr. 30, 2019, mailed Dec. 29, 2021, 14 pgs.

Moreno, Carlos Stephen; Final Office Action for U.S. Appl. No. 17/702,622, filed Mar. 23, 2022, mailed Jun. 6, 2023, 20 pgs.

Moreno, Carlos Stephen; Non-Final Office Action for U.S. Appl. No. 17/702,622, filed Mar. 23, 2022, mailed Dec. 13, 2022, 27 pgs.

Moreno, Carlos Stephen; Non-Final Office Action for U.S. Appl. No. 17/702,622, filed Mar. 23, 2022, mailed Sep. 6, 2023, 23 pgs.

Moreno, Carlos Stephen; Notice of Allowance for U.S. Appl. No. 17/702,622, filed Mar. 23, 2022, mailed Jan. 4, 2024, 13 pgs.

Moreno, Carlos Stephen; Extended European Search Report for application No. 20164321.0, filed Mar. 19, 2020, mailed Feb. 2, 2021, 17 pgs.

Moreno, Carlos Stephen; Office Action for European application No. 20164321.0, filed Mar. 19, 2020, mailed Sep. 29, 2020, 14 pgs.

Moreno, Carlos Stephen; Extended European Search Report for application No. 23161986.7, filed Mar. 19, 2020, mailed Jun. 15, 2023, 13 pgs.

Moreno, Carlos Stephen; Final Office Action for U.S. Appl. No. 18/228,030, filed Jul. 31, 2023, mailed May 29, 2025, 23 pgs.

Moreno, Carlos Stephen; Non-Final Office Action for U.S. Appl. No. 18/228,030, filed Jul. 31, 2023, mailed Dec. 12, 2024, 45 pgs.

Moreno, Carlos Stephen; Notice of Allowance for U.S. Appl. No. 18/228,030, filed Jul. 31, 2023, mailed Oct. 7, 2025, 22 pgs.

Moreno, Carlos Stephen; Rule 71(3) for application No. 23161986.7, filed Mar. 19, 2023, mailed Sep. 24, 2025, 39 pgs.

* cited by examiner

OUTER HOUSING WITH A SIDEWALL SHELL AND CAP ATTACHED THERETO FOR A PRESSURE MONITORING SYSTEM

CROSS-REFERENCE TO RELATED APPLICATIONS

The present application is a continuation of U.S. application Ser. No. 17/702,622, filed Mar. 23, 2022, which is a continuation of U.S. application Ser. No. 16/399,109, filed Apr. 30, 2019 and issued as U.S. Pat. No. 11,313,748 on Apr. 26, 2022, which is a continuation-in-part of U.S. application Ser. No. 16/252,099, filed Jan. 18, 2019, which issued as U.S. Pat. No. 11,067,464 on Jul. 20, 2021, all of which are hereby specifically incorporated by reference herein in their entireties.

TECHNICAL FIELD

This disclosure relates to the field of fire hydrants. More specifically, this disclosure relates to a housing for a hydrant pressure monitoring system.

BACKGROUND

Fire hydrants are connected to fluid pipeline systems, such as municipal water systems, and allow firefighters to access the water supply in the pipeline system. Wet barrel fire hydrants can define a hydrant cavity that can be filled with water, or another fluid, even when the hydrant is not in operation. Typically, wet barrel hydrants can be found in regions where cold weather conditions are less common.

It can be desirable to monitor the water pressure in a water pipeline system. However, pressure monitors mounted to the pipeline below ground can be difficult to access for maintenance or replacement. Furthermore, it can be desirable to monitor for leaks in a water pipeline system. However, like pressure monitors, it can be difficult to access leak detection systems that are below ground. Typical leak detection systems do not constantly monitor for leaks, but rather monitor for leaks on a fixed schedule—for example, once per day. As such, leaks can go undetected and can even worsen during the time between scheduled leak detection cycles.

Pressure monitoring systems often comprise a housing for protecting sensitive elements within an interior of the pressure monitoring system. In housings comprising multiple separate housing components, gaps can be formed therebetween. Water and/or other undesirable elements can enter the interior of the pressure monitoring system through the gaps. In some aspects, spaces between separate housing components can also allow for accidental or objectionable disassembly of the housing by providing access points for tools that can aid in disassembly. Fasteners for connecting the separate housing components can also be damaged when a force is applied at or near the joints thereof.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is an outer housing for a pressure monitoring system comprising a sidewall shell defining an axis extending centrally therethrough and comprising an annular inner sidewall projection extending from a top end thereof; and a cap mounted to the sidewall shell, the cap defining an annular cap recess, wherein the annular inner sidewall projection is configured to engage the annular cap recess.

Also disclosed is a pressure monitoring system for a wet barrel hydrant comprising a pressure sensor assembly comprising a pressure sensor and a connector, the pressure sensor configured to measure the pressure of a fluid received in the wet barrel hydrant, the connector configured to attach the pressure monitoring system to the wet barrel hydrant; a base assembly comprising a mounting flange, the pressure sensor assembly coupled to the base assembly; and an outer housing coupled to the mounting flange, the outer housing comprising a sidewall shell and a cap, the sidewall shell comprising an annular inner sidewall projection configured to engage an annular cap recess of the cap.

Also disclosed is an outer housing for a pressure monitoring system comprising a sidewall shell defining an axis extending centrally therethrough and an annular outer sidewall projection; a cap mounted to the sidewall shell, the cap defining an annular outer cap surface, the annular outer cap surface defining an annular notch formed therein, the annular outer sidewall projection extending alongside the annular outer cap surface; and a packing received in the annular notch and configured to create a watertight seal between the annular outer sidewall projection and the annular outer cap surface.

Furthermore, disclosed is an outer housing for a pressure monitoring system comprising a sidewall shell comprising an annular inner sidewall projection extending from a top end thereof; a cap mounted to the sidewall shell, the cap defining an inner cap surface, an outer cap surface, a cap bottom end, and an annular cap recess extending into the cap bottom end between the outer cap surface and the inner cap surface, wherein the annular inner sidewall projection is configured to engage the annular cap recess; and an antenna assembly directly mounted to the inner cap surface, the antenna assembly comprising an antenna.

Also disclosed is a pressure monitoring system for a wet barrel hydrant comprising a pressure sensor assembly comprising a pressure sensor and a connector, the pressure sensor configured to measure a pressure of a fluid received in the wet barrel hydrant, the connector configured to attach the pressure monitoring system to the wet barrel hydrant; a base assembly comprising a mounting flange, the pressure sensor assembly coupled to the base assembly; an outer housing coupled to the mounting flange, the outer housing comprising a sidewall shell and a cap, the sidewall shell comprising an annular inner sidewall projection configured to engage an annular cap recess of the cap; and an antenna assembly comprising an antenna, the antenna assembly mounted to the cap and disposed external to the sidewall shell.

Additionally, disclosed is an outer housing for a pressure monitoring system comprising a sidewall shell defining an axis extending centrally therethrough and an annular outer sidewall projection; a cap mounted to the sidewall shell, the cap defining an annular outer cap surface, the annular outer cap surface defining an annular notch formed therein, the annular outer sidewall projection extending alongside the annular outer cap surface; a packing received in the annular notch and configured to create a watertight seal between the annular outer sidewall projection and the annular outer cap surface; and an antenna assembly comprising an antenna, the antenna assembly mounted to the cap and disposed external to the sidewall shell.

Further disclosed is an outer housing for a pressure monitoring system comprising a sidewall shell defining an outer shell surface and a top end, the sidewall shell comprising an annular outer sidewall projection extending from the top end, the outer sidewall projection defining at least a portion of the outer shell surface; and a cap mounted to the sidewall shell, the cap defining an inner cap surface and an annular outer cap surface opposite the inner cap surface, the outer sidewall projection extending alongside the outer cap surface; wherein the outer cap surface defines a cap curved portion and the outer sidewall projection defines a projection curved portion meeting the cap curved portion, such that the cap is substantially flush with the sidewall shell.

Also disclosed is an outer housing for a pressuring monitoring system comprising a sidewall shell defining an outer shell surface and a top end, the sidewall shell comprising an annular outer sidewall projection extending from the top end, the outer sidewall projection defining at least a portion of the outer shell surface; and a cap mounted to the sidewall shell, the cap defining an inner cap surface and an annular outer cap surface opposite the inner cap surface, the outer sidewall projection extending alongside the outer cap surface; wherein the outer sidewall projection defines a sloped top end and the outer cap surface defines a sloped portion configured to rest on the sloped top end to prevent intrusion of water between the sidewall shell and the cap.

Finally, disclosed is an outer housing for a pressuring monitoring system comprising a sidewall shell comprising an annular inner sidewall projection extending from a top end thereof; and a cap mounted to the sidewall shell, the cap defining an inner cap surface, an outer cap surface, a cap bottom end, and an annular cap recess extending into the cap bottom end between the outer cap surface and the inner cap surface, wherein the annular inner sidewall projection engages the annular cap recess; wherein the annular inner sidewall projection defines a slanted sidewall projection surface and the annular cap recess defines a slanted cap recess surface confronting the slanted sidewall projection surface.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
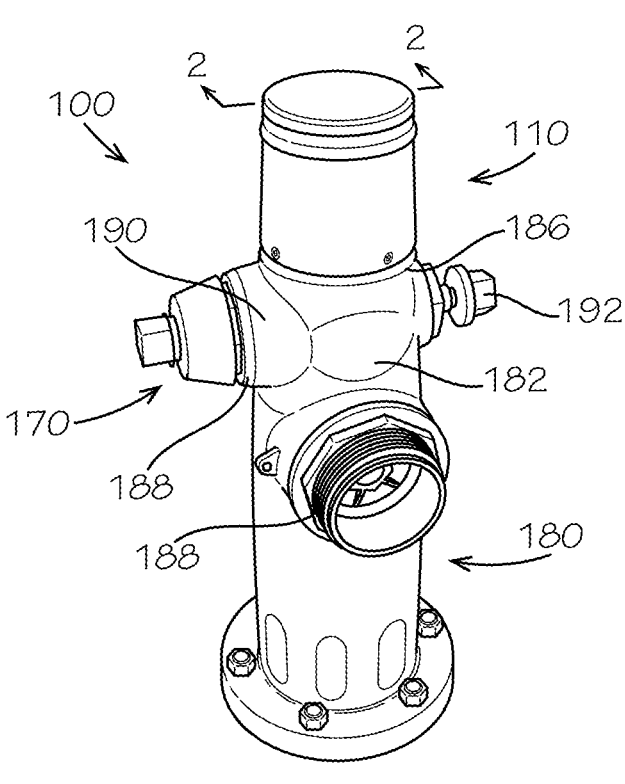
FIG. 1 is a perspective view of a pressure monitoring and leak detection system mounted to a hydrant and comprising a pressure monitoring subsystem and a leak detection subsystem, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a pressure monitoring system and associated methods, systems, devices, and various apparatus. Example aspects of the pressure monitoring system can comprise a connector for connecting the pressure monitoring system to a wet barrel hydrant and a pressure sensor for monitoring the pressure of water received in the wet barrel hydrant. It would be understood by one of skill in the art that the disclosed pressure monitoring system is described in but a few exemplary aspects among many. No particular terminology or description should be considered limiting on the disclosure or the scope of any claims issuing therefrom.

FIG. 1 illustrates a first aspect of a pressure monitoring and leak detection system 100 according to the present disclosure. According to example aspects, the pressure monitoring and leak detection system 100 can comprise a pressure monitoring subsystem 110 ("PMS") and a leak detection subsystem 170 ("LDS"). As shown, each of the pressure monitoring subsystem 110 and leak detection subsystem 170 can be mounted to a fire hydrant; for example, a wet barrel hydrant 180. The wet barrel hydrant 180 can define a barrel 182 and an interior hydrant cavity 484 (shown in FIG. 4) defined by the barrel 182. Water, or another fluid, from a pipeline system (not shown) can be housed within the hydrant cavity 484. In example aspects, the pressure monitoring subsystem 110 can be coupled to the wet barrel hydrant 180 at a top end 186 of the barrel 182, and the leak detection subsystem 170 can be coupled to the wet barrel hydrant 180 at a side of the barrel 182. For example, the wet barrel hydrant 180 can comprise one or more nozzles 188 extending from the barrel 182, and the leak detection subsystem 170 can be coupled to a nozzle 188 extending from a left side 190 of the barrel 182, relative to the orientation shown. The barrel 182 can further comprise an operation nut 192, which can be rotated to open and close a valve (not shown) housed within or below the barrel 182, such as a valve within the nozzle 188. Opening and closing the valve can supply or cut off water flow, respectively, to the wet barrel hydrant 180.

Figure 2:
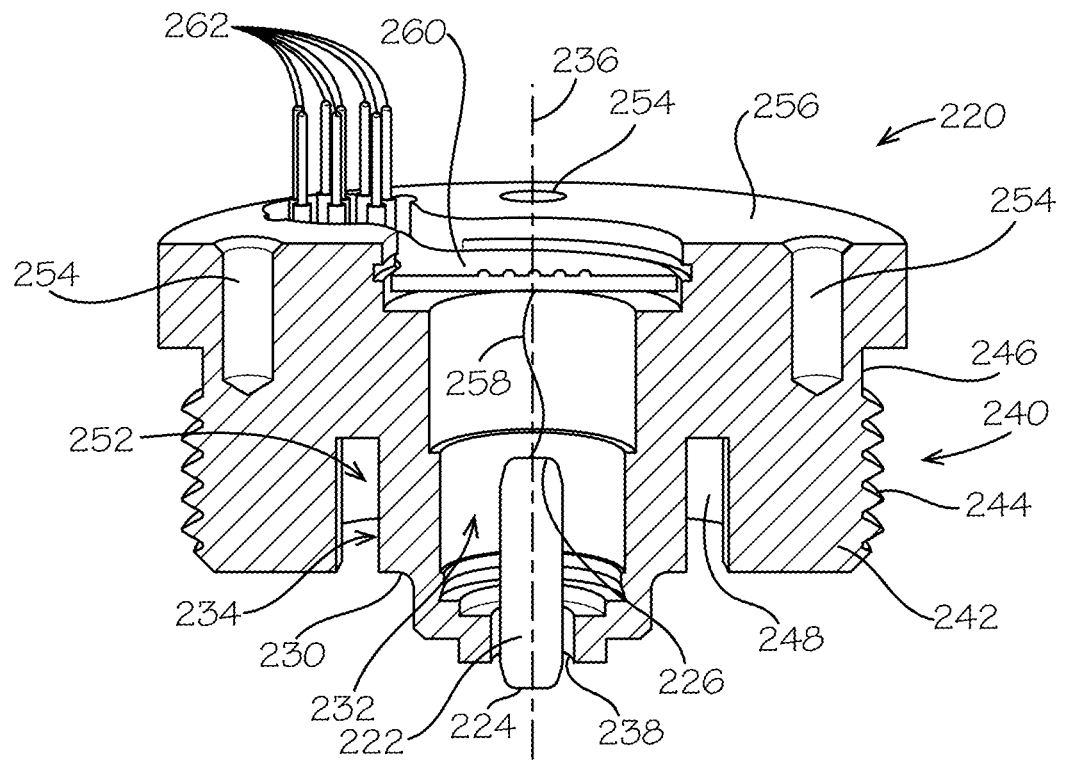
FIG. 2 is a cross-sectional view of a pressure sensor assembly of the pressure monitoring subsystem of FIG. 1 taken along line 2-2 in FIG. 1.

FIG. 2 illustrates an aspect of a pressure sensor assembly 220 according to the present disclosure. As shown, the pressure sensor assembly 220 can comprise a pressure sensor 222 and a pressure sensor housing 230. The pressure sensor 222 can be, for example, a piezo-resistive strain gauge, a capacitive gauge, an electromagnetic gauge, a piezoelectric device, or any other suitable device known in the art for measuring pressure Example aspects of the pressure sensor housing 230 can define an interior housing cavity 232 for receiving the pressure sensor 222. The housing cavity 232 can define a center axis 236, as shown. A portion of the pressure sensor 222 can extend through an opening 238 in the housing cavity 232 to measure the pressure of water outside of the housing cavity 232. In other aspects, the pressure sensor can be recessed into the housing cavity 232 and can measure the pressure of water received within the housing cavity 232. Example aspects of the pressure sensor housing 230 can further comprise a connector 240 for connecting the pressure sensor assembly 220 to the wet barrel hydrant 180 (shown in FIG. 1). In other aspects, the connector 240 can be configured to connect the pressure sensor assembly 220 to another suitable device, such as, for example, a pipe, a valve, etc. The connector 240 can be a threaded flange 242, as shown, and a threading 244 can be formed on an outer surface 246 of the threaded flange 242; however, in other aspects, the connector 240 can be any other suitable fastener known in the art, including, but not limited to, a clip, rivet, weld, adhesive, and the like. Furthermore, in other aspects, the threading 244 can be formed on an inner surface 248 of the threaded flange 242. As shown in the present FIG. 2, in some aspects, an annular groove 252 can be formed between the inner surface 248 of the threaded flange 242 and an outer surface 234 of the housing cavity 232. Furthermore, the pressure sensor housing 230 can define one or more mounting bores 254 extending into a locking disc 256 of the pressure sensor housing 230. The mounting bores 254 can be blind holes, as shown, or can be through-holes. According to example aspects, the locking disc 256 can be oriented above the connector 240, relative to the orientation shown.

Figure 3:
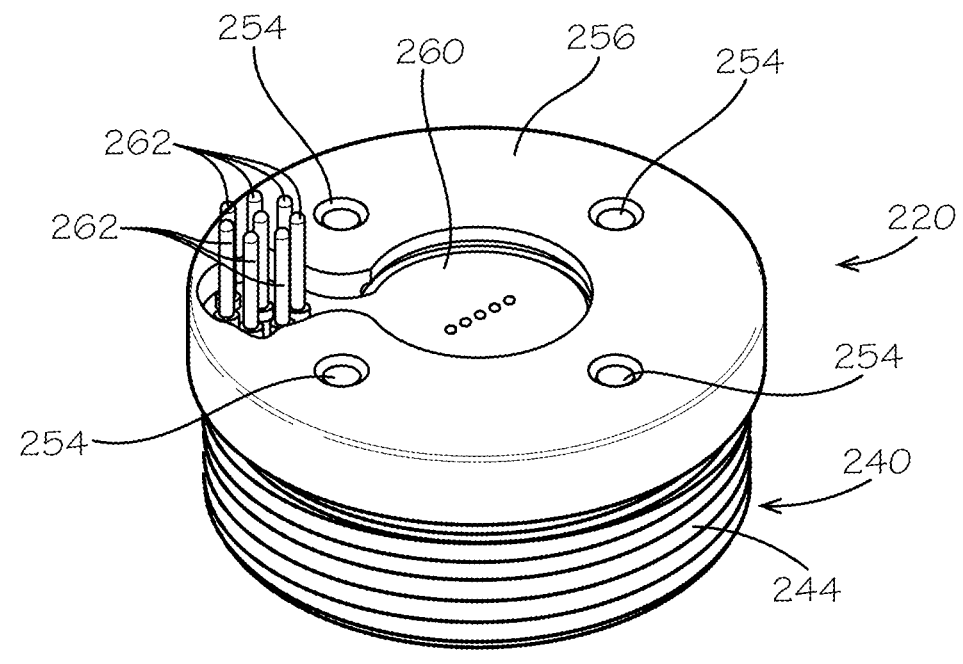
FIG. 3 is a top perspective view of pressure sensor assembly of FIG. 2.

Example aspects of the pressure sensor 222 can be substantially centrally located within the housing cavity 232. The pressure sensor 222 can define a sensing end 224 extending through the opening 238 and a wire end 226 opposite the sensing end 224 and housed within the housing cavity 232. The sensing end 224 can be in contact with the water, or other fluid, in the hydrant cavity 484 (shown in FIG. 4) and can be configured to measure the pressure of the water. A pressure sensor wire 258 can be connected to the wire end 226 of the pressure sensor 222 and can be configured to electronically communicate pressure data measured by the pressure sensor 222 to an auxiliary PCB 260 (printed circuit board), as shown. Furthermore, example aspects of the auxiliary PCB can comprise one or more pins 262 configured to electrically connect the pressure sensor wire 258 to a main PCB 646 (shown in FIG. 6). The pins 262 can be positioned to connect to the main PCB 646 at a desired location. For example, as shown, the pins 262 can be offset from the center axis 236. FIG. 3 illustrates a perspective view of the pressure sensor assembly 220. As shown, the pressure sensor assembly 220 can define a generally annular shape about the center axis 236. Also, in the present aspect, the auxiliary PCB 260 can define a generally hourglass shape. The shape of the auxiliary PCB can allow the pins 262 to be offset from the center axis 236 to a desired location on the auxiliary PCB 260, such that the pins 262 can be positioned to connect to the main PCB 646 where desired. In other aspects, the auxiliary PCB 260 can define any suitable shape can allow the pins 262 to be positioned as needed to connect to the main PCB 464 at a desired location.

Figure 4:
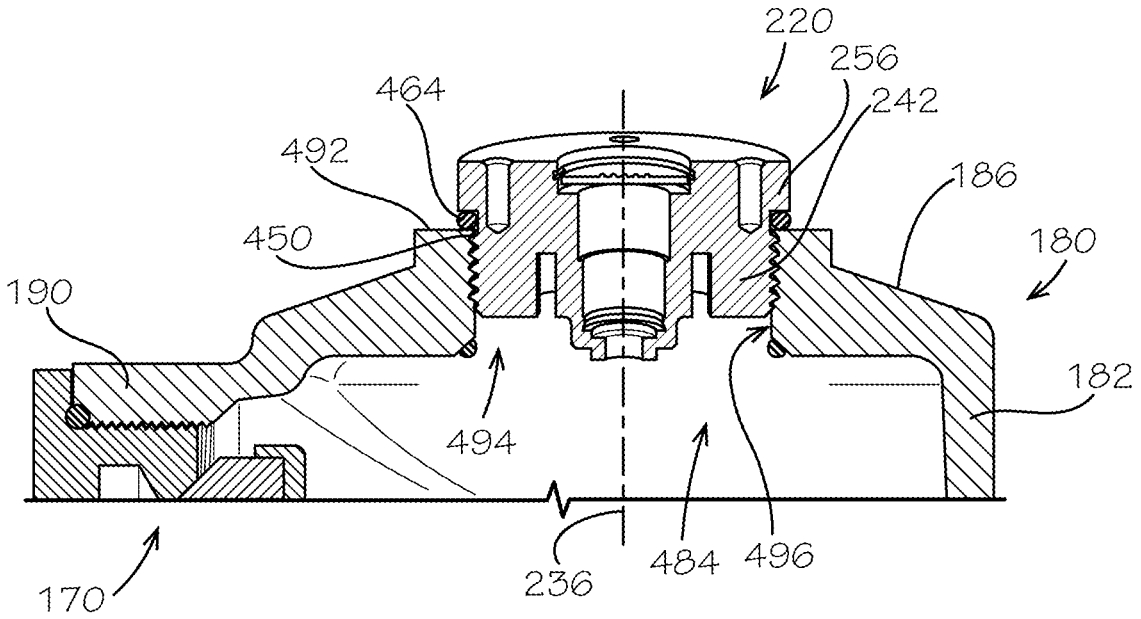
FIG. 4 is a cross-sectional view of the pressure sensor assembly of FIG. 2 mounted to the hydrant of FIG. 1 taken along line 2-2 in FIG. 1.
Figure 5:
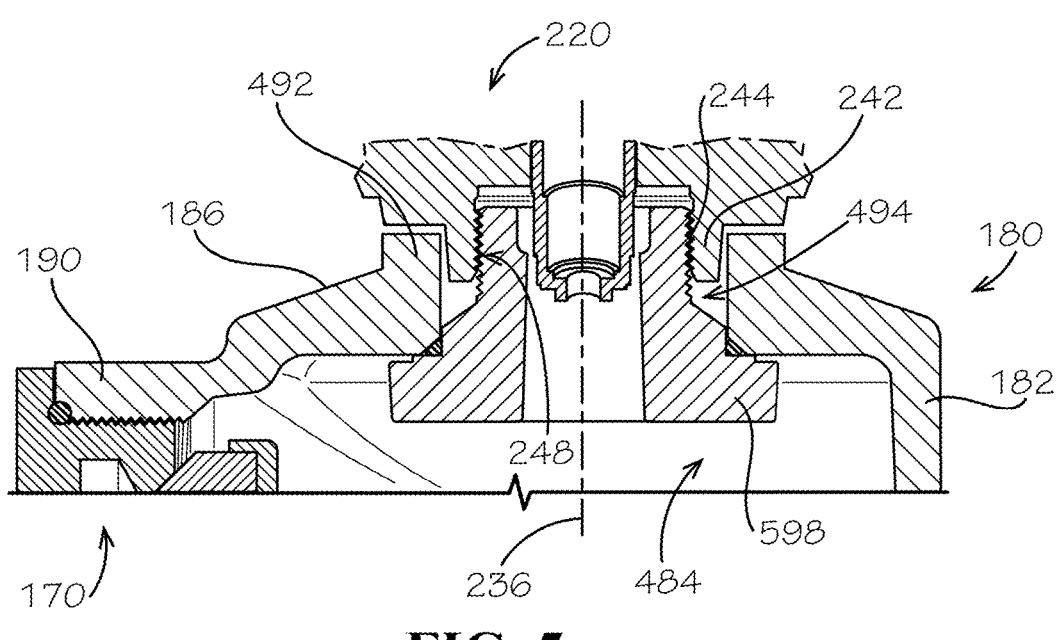
FIG. 5 is a cross-sectional view of the pressure sensor assembly mounted to the hydrant, according to another aspect of the present disclosure, taken along line 2-2 in FIG. 1.

FIG. 4 illustrates the pressure sensor assembly 220 mounted to the top end 186 of the barrel 182 of the wet barrel hydrant 180, according to an aspect of the disclosure. As shown, a hydrant flange 492 can extend from the top end 186 of the barrel 182. The hydrant flange 492 can define a hydrant bore 494 therethrough, and the hydrant bore 494 can be in fluid communication with the hydrant cavity 484. The threaded flange 242 of the pressure sensor assembly 220 can be received within the hydrant bore 494 and can be configured to threadably mate with a threaded bore wall 496 to couple the pressure sensor assembly 220 to the top end 186 of the wet barrel hydrant 180. In some aspects, an O-ring 464 can be positioned adjacent a proximal end 450 of the threaded flange 242 to provide a seal and a buffer between the hydrant flange 492 and the locking disc 256. In another aspect, as illustrated in FIG. 5, the wet barrel hydrant 180 can define a threaded mounting nut 598 mounted within the hydrant bore 494 at the top end 186 of the barrel 182. In the present aspect, the threading 244 can be defined on the inner surface 248 of the threaded flange 242, and the threaded flange 242 can be configured to mate with the threaded mounting nut 598. As shown, in example aspects, the threaded flange 242 can be received within the hydrant bore 494 between the threaded mounting nut 598 and the hydrant flange 492. The threaded flange 242 can be configured to threadably mate with the threaded mounting nut 598 to secure the pressure sensor assembly 220 to the top end 186 of the wet barrel hydrant 180.

Figure 6:
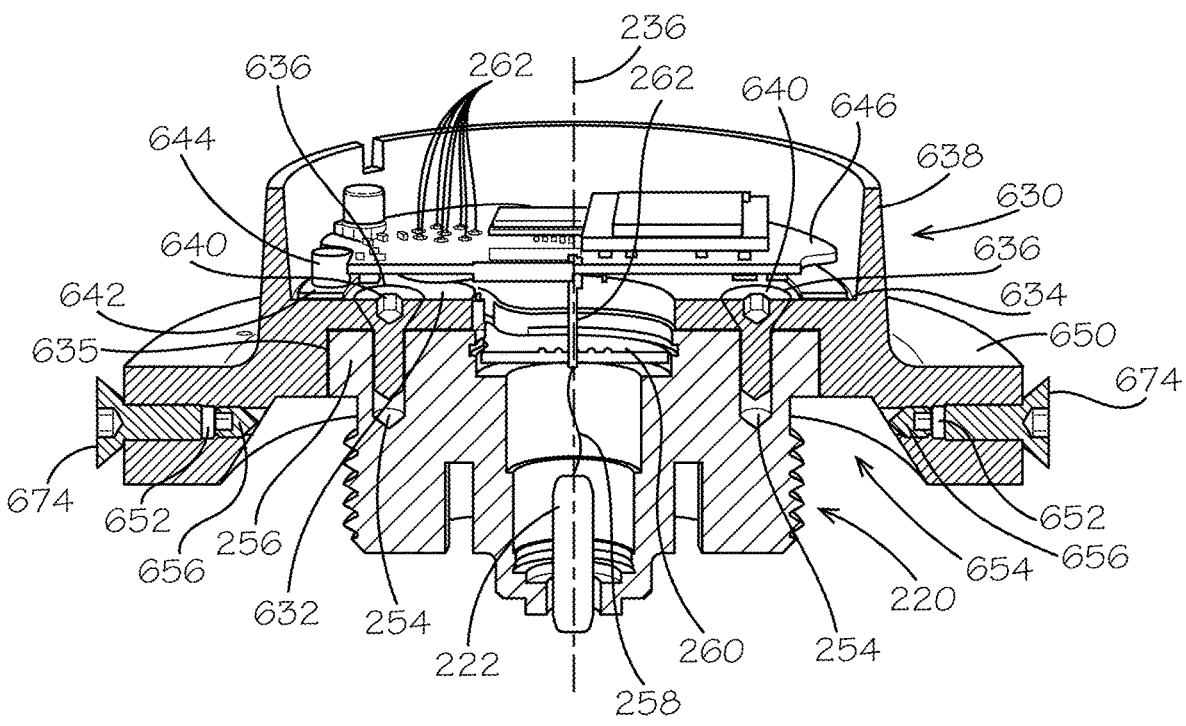
FIG. 6 is a cross-sectional view of the pressure sensor assembly of FIG. 2 mounted to a base assembly of the pressure monitoring subsystem of FIG. 1 taken along line 2-2 in FIG. 1.

FIG. 6 illustrates the pressure sensor assembly 220 mounted to a base assembly 630 of the pressure monitoring subsystem 110 (shown in FIG. 1), according to an example aspect. As shown, the base assembly 630 can comprise a central support 632 and a cylindrical wall 638 extending axially from a peripheral edge 634 of the central support 632. The base assembly 630 can further define a base recess 635 that can be configured to receive the locking disc 256 of the pressure sensor assembly 220. As shown, one or more fasteners 640 can extend through mounting bores 636 of the central support 632 and can engage the mounting bores 254 of the pressure sensor assembly 220 to couple the base assembly 630 to the pressure sensor assembly 220. In some aspects, coupling the pressure sensor assembly 220 to the base assembly 630 can comprise integrally or monolithically forming the base assembly 630 with the pressure sensor assembly 220. According to example aspects, a PCB mounting ring 642 can be supported on the central support 632 and the main PCB 646 can be received on the PCB mounting ring 642, as shown. According to example aspects, the cylindrical wall 638 can surround the main PCB 646 to aid in protecting the main PCB 646 from external factors, such as moisture, dust particles, dirt particles, and the like. Example aspects of the main PCB 646 can be secured to the PCB mounting ring 642 by one or more fasteners (not shown), such as, for example, clips, screws, adhesives, and the like. Furthermore, example aspects of the PCB mounting ring 642 can comprise one or more positioning rods 644 that can aid in properly positioning the main PCB 646 on the PCB mounting ring 642.

As shown, distal ends of the pins 262 of the auxiliary PCB 260 can engage the main PCB 646. In the present aspect, as shown, the auxiliary PCB 260 can comprise an additional pin 262 substantially aligned with the center axis 236 and connected to the main PCB 646 at a desired location. The pressure sensor 222 can communicate pressure data to the main PCB 646 through the pressure sensor wire 258 and the auxiliary PCB 260. In some aspects, the pressure sensor 222 can continually communicate pressure data to the main PCB 646, while in other aspects, the pressure sensor 222 can communicate pressure data only when an anomaly is detected. The main PCB 646 can then evaluate the pressure data to determine whether a concern is present. In instances wherein the pressure data presents a concern, the main PCB 646 can electrically trigger an antenna 854 (shown in FIG. 8) to send an alert signal to a third party (e.g., an external operations center), as will be described in further detail below.

According to example aspects, a potting compound, such as silicone, epoxy resin, polyurethane, or any other suitable potting compound can fill a portion of the base assembly 630 to cover the main PCB 646. Covering the main PCB 646 with a potting compound can protect the main PCB 646 from moisture, corrosion, and vibrations, can aid in heat dissipation, and can provide other benefits. In some aspects, the auxiliary PCB 260, the pins 262, and/or other electronic components of the pressure monitoring subsystem 110 can be protected from external factors by potting.

Example aspects of the base assembly 630 can further comprise an annular mounting flange 650 extending radially outward from the central support 632. An annular groove 654 can be formed between the annular mounting flange 650 and threaded flange 242 of the pressure sensor assembly 220. In example aspects, the hydrant flange 492 (shown in FIG. 4) of the wet barrel hydrant 180 (shown in FIG. 1) can be received within the annular groove 654, as illustrated in FIG. 10. Furthermore, in example aspects, the annular mounting flange 650 can comprise on or more radially-extending hydrant mounting bores 652, as shown. One or more fasteners, such as the cone point screws 656 depicted herein, can be received within the hydrant mounting bores 652 and can engage the hydrant flange 492 to further aid in securing the pressure monitoring assembly to the wet barrel hydrant 180. Further, according to example aspects, security screws 674 can be received within the hydrant mounting bores 652 behind the cone point screws 656. The security screws 674 are described in further detail below with reference to FIG. 9.

Figure 7:
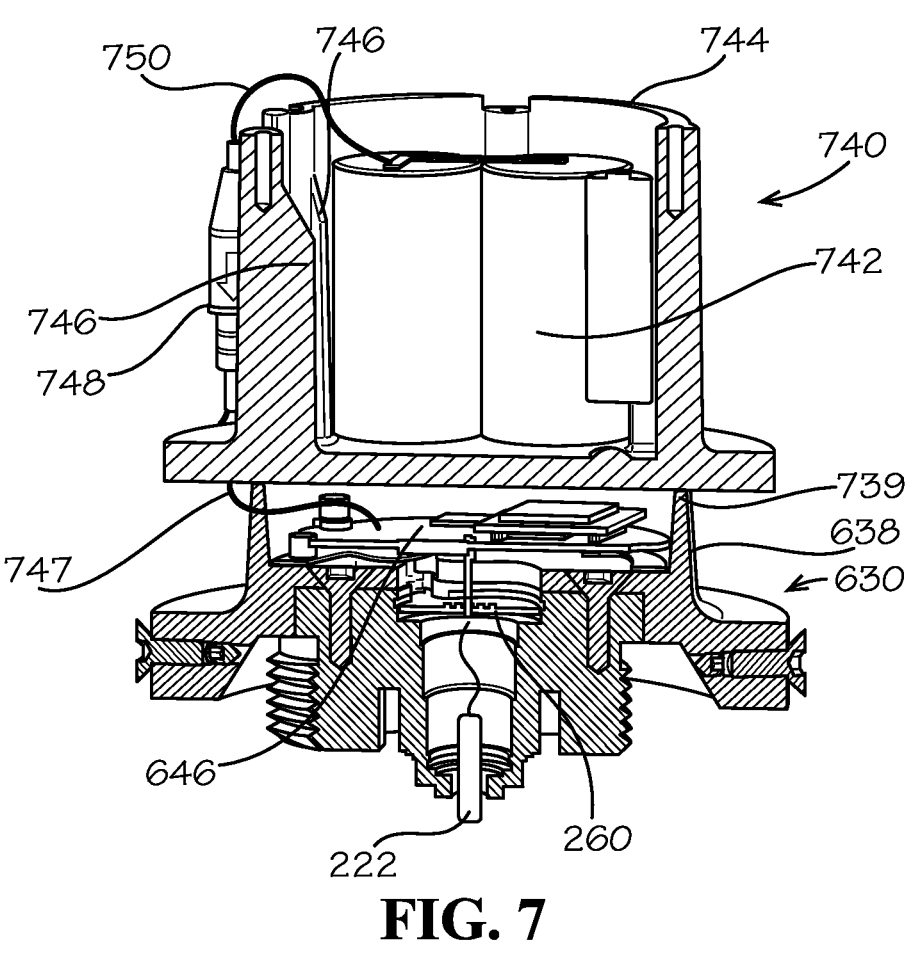
FIG. 7 is cross-sectional view of the base assembly of FIG. 6 mounted to a power assembly of the pressure monitoring subsystem of FIG. 1 taken along line 2-2 in FIG. 1.

As shown in FIG. 7, the pressure monitoring subsystem 110 (shown in FIG. 1) can further comprise a power assembly 740 mounted to the base assembly 630. The power assembly 740 can comprise a power source, such as a battery pack 742, as shown, for powering various components of the pressure monitoring subsystem 110. For example, the auxiliary and main PCBs 260,646, the pressure sensor 222, and the antenna 854 (shown in FIG. 8) can all be powered by the battery pack 742. Example aspects of the power assembly 740 can further comprise a battery housing 744 within which the battery pack 742 can be received. The battery housing 744 can comprise one or more standoffs 746, as shown, which can aid in properly positioning the battery pack 742 within the battery housing 744. In some aspects, the battery pack 742 can be potted in place. For example, the battery housing 744 can be partially or completely filled with a potting compound, such as, for example, silicone, epoxy resin, polyurethane, or any other suitable potting compound. The potting compound can be configured to protect the battery pack 742 from moisture, corrosion, vibrations, to aid in heat dissipation, and to provide other benefits. According to example aspects, the battery housing 744 can be positioned at and rest upon a distal end 739 of the cylindrical wall 638 of the base assembly 630. Furthermore, a power connector 748 can be provided for electrically connecting the battery pack 742 to the main PCB 646. In one aspect, as shown, a battery wire 750 can connect to the power connector 748 and a PCB wire 747 can connect to the power connector 748 to allow power to be transferred from the battery pack 742 to the main PCB 646. Example aspects of the power connector 748 can be received in an annular gap 982 (shown in FIG. 9) defined between the battery housing 744 and an outer housing 980 (shown in FIG. 9) of the pressure monitoring subsystem 110.

Figure 8:
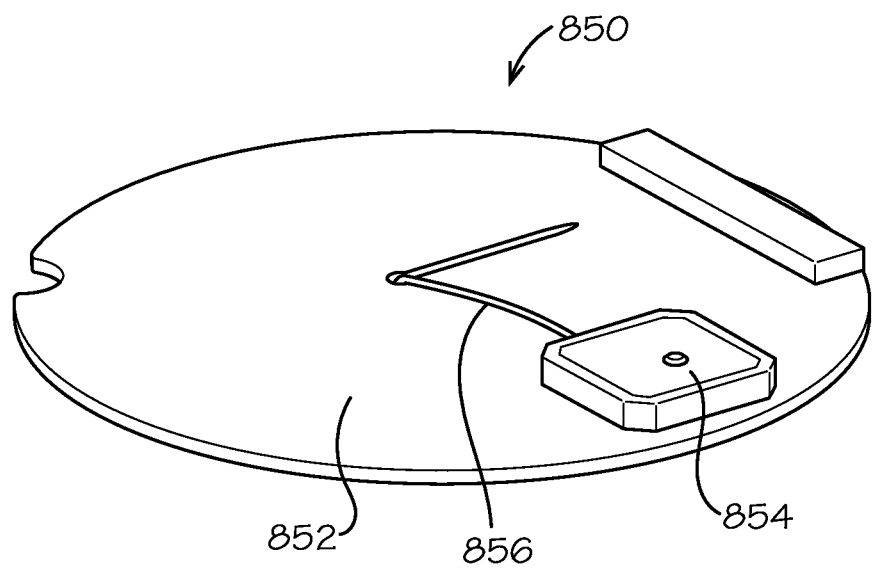
FIG. 8 is a top perspective view of an antenna assembly of the pressure monitoring subsystem of FIG. 1.

FIG. 8 illustrates an antenna assembly 850 of the pressure monitoring subsystem 110 (shown in FIG. 1). As shown, the antenna assembly 850 can comprise an antenna board 852 and the antenna 854 mounted on the antenna board 852. The antenna 854 can be configured to send signals representative of the pressure data measured by the pressure sensor 222 (shown in FIG. 2). Example aspects of the antenna 854 can be substantially horizontal-facing when the pressure monitoring subsystem 110 is mounted to the wet barrel hydrant 180 (shown in FIG. 1); however, in other aspects, the antenna 854 can be substantially vertical-facing or can face any other desired direction, including one or more antennas 854 facing multiple directions. Furthermore, as shown, the antenna 854 can comprise an antenna wire 856 for electrically connecting the antenna 854 to the main PCB 646 (shown in FIG. 6). According to example aspects, the battery pack 742 (shown in FIG. 7), pressure sensor 222, auxiliary PCB 260 (shown in FIG. 2), main PCB 646, and the antenna 854 can all be in electrical communication with each other. In some aspects, portions of the antenna assembly 850 can be protected from various external factors by a potting compound, such as the potting compounds described above.

Figure 9:
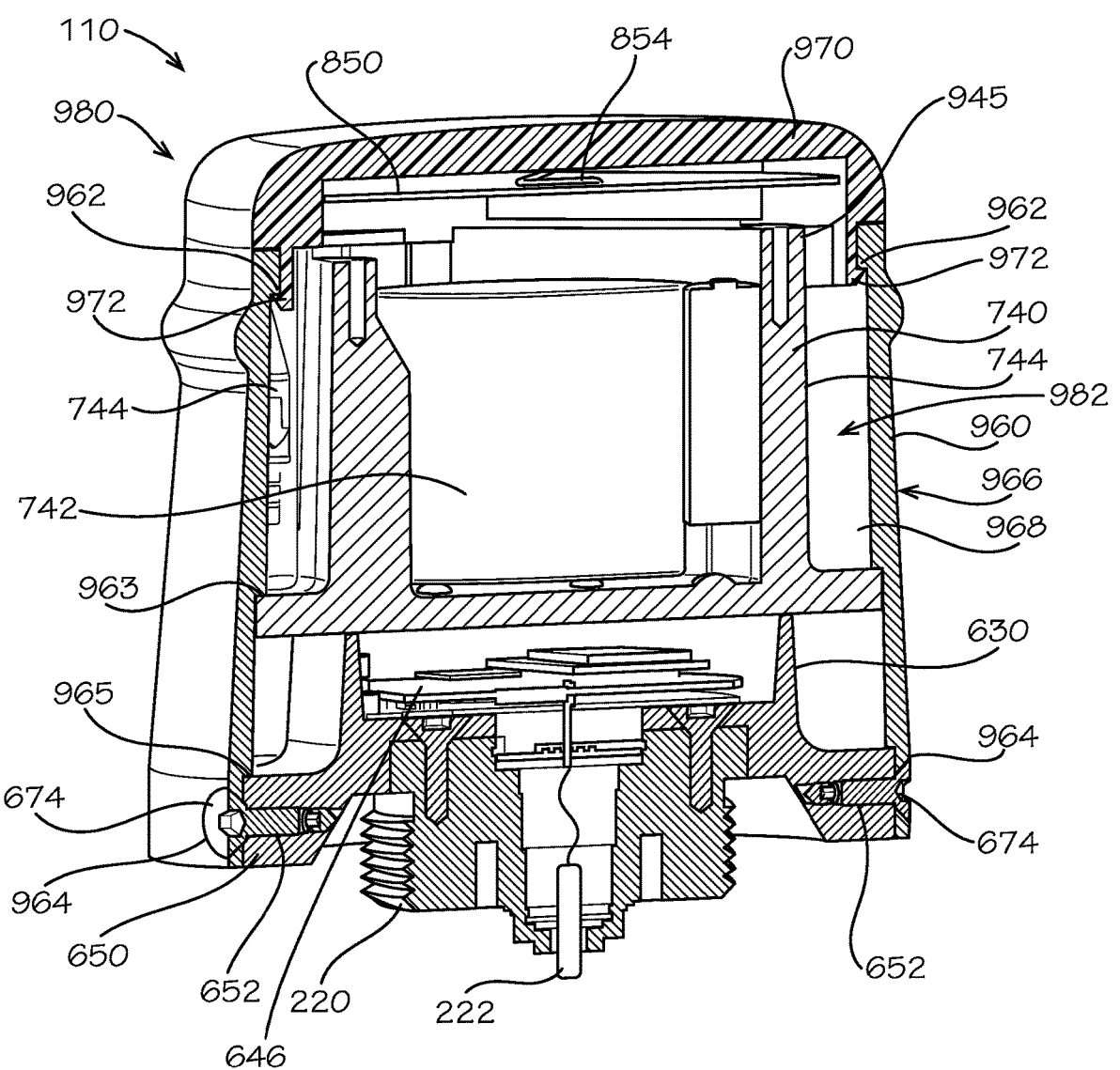
FIG. 9 is a cross-sectional view of the pressure monitoring and leak detection system of FIG. 1, taken along line 2-2 of FIG. 1.
Figure 10:
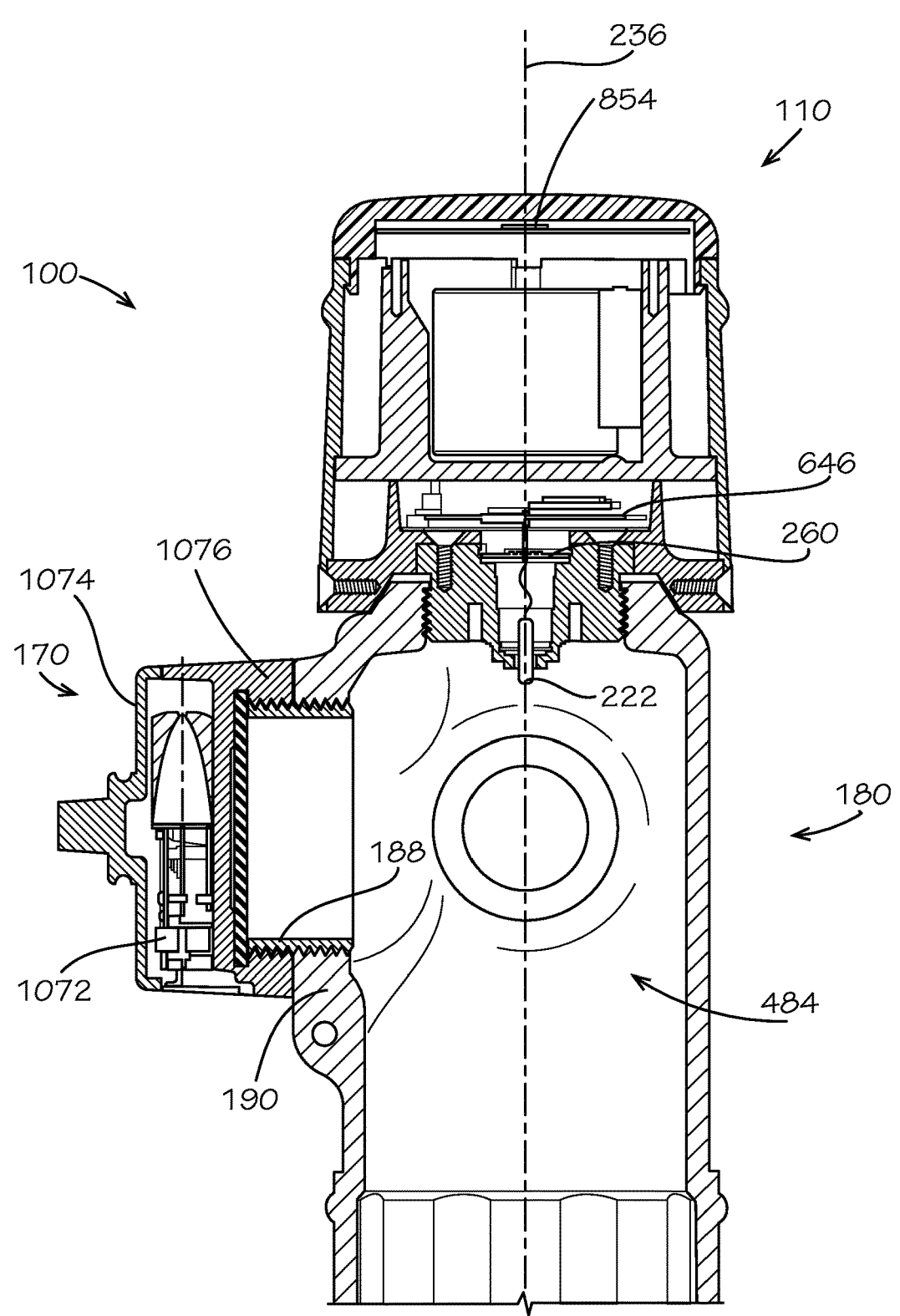
FIG. 10 is a cross-sectional view of the pressure monitoring and leak detection system of FIG. 1 mounted to the hydrant of FIG. 1, taken along line 2-2 in FIG. 1.

FIG. 9 illustrates an assembled view of the pressure monitoring subsystem 110. As shown, the pressure monitoring subsystem 110 further can comprise a sidewall shell 960 and a cap 970 for enclosing various components of the pressure monitoring subsystem 110, including, for example, the antenna assembly 850, the power assembly 740, the base assembly 630, and portions of the pressure sensor assembly 220. In the present aspect, the cap 970 and the sidewall shell 960 can together define the outer housing 980 that can enclose at least the main PCB 646 and the antenna 854. In example aspects, the antenna assembly 850 can be mounted to the cap 970 proximate to a distal end 945 of the battery housing 744, as shown. Example aspects of the cap 970 can be formed from a non-ferrous material, so that the material of the cap 970 does not interfere with the ability of the antenna 854 to send signals to the third party. For example, the cap 970 can be formed from a plastic material, or any other suitable non-ferrous material having a sufficient rigidity for protecting the antenna 854 and other interior components of the pressure monitoring subsystem 110. Furthermore, in example aspects, the cap 970 can define a fastener, such as, for example, one or more clips 972, for engaging a mating fastener of the sidewall shell 960, such as, for example, an interior annular ridge 962, to secure the cap 970 to the sidewall shell 960. In other aspects, any other suitable fastener know in the art can be used, including, but not limited to, clips, snaps, adhesives, and the like. In still other aspects, the cap 970 can be monolithically formed form with the sidewall shell 960.

Example aspects of the sidewall shell 960 can also be formed from a material having a sufficient rigidity for protecting interior components of the pressure monitoring subsystem 110. In some aspects, the sidewall shell 960 can be formed from a ferrous material, such as, for example, stainless steel or iron. In other aspects, the sidewall shell 960 can be formed from a non-ferrous material, such as, for example, aluminum or plastic, such as if it is desired to align the antenna 850 to transmit signal through the sidewall shell 960. Example aspects of the sidewall shell can define a first shoulder 963 configured to engage the battery housing 744 to hold the battery housing 744 against the base assembly 630, as shown. Furthermore, as shown, the sidewall shell 960 can comprise shell mounting bores 964 formed proximate the mounting flange 650 of the base assembly 630, and which can extend from an outer surface 966 of the sidewall shell 960 to an inner surface 968 of the sidewall shell 960. The shell mounting bores 964 of the sidewall shell 960 can be configured to align with the hydrant mounting bores 652 of the mounting flange 650, and a fastener, such as the security screws 674 illustrated herein, can be configured to extending through each corresponding pair of shell and hydrant mounting bores 964,652 to secure the sidewall shell 960 to the base assembly 630. According to example aspects, the sidewall shell can define a second shoulder 965 configured to engage the mounting flange 650 of the base assembly 630, which can aid in aligning the shell mounting bores 964 with the hydrant mounting bores 652. In some aspects, the security screws 674 can contact the cone point screws 656 to move the screws 656 inwards in the hydrant mounting bores 652. In example aspects, the sidewall shell 960 can be selectively removed for replacing the battery pack 742 and/or for repairing or replacing other interior components of the pressure monitoring subsystem 110.

FIG. 10 illustrates a cross-sectional view of the pressure monitoring and leak detection system 100 mounted to the wet barrel hydrant 180, take along line 2-2 in FIG. 1. As shown, the leak detection subsystem 170 can be attached to the nozzle 188 on the left side 190 of the wet barrel hydrant 180, relative to the orientation shown. Example aspects of the leak detection subsystem 170 can be substantially similar to the hydrant cap leak detector disclosed in U.S. application Ser. No. 16/121,136, filed Sep. 4, 2018, which is hereby incorporated by reference herein in its entirety. Other known hydrant cap leak detectors can be utilized in other aspects. As shown, the leak detection subsystem 170 can comprise a vibration sensor 1072. Example aspects of the vibration sensor 1072 can be housed in a leak detection housing 1074. As shown, the leak detection housing 1074 can be formed as a nozzle cap for the nozzle 188. In example aspects, the leak detection housing 1074 can comprise a threaded connector 1076 for mounting the leak detection housing to the nozzle 188. The vibration sensor 1072 can be configured to detect leaks within pipeline system by monitoring vibrations in the pipeline system. For example, the vibration sensor 1072 can monitor vibrations in the metal of pipes comprised by the pipeline system. The vibration readings from the vibration sensor 1072 can be processed by a leak detection PCB (not shown) to determine whether a leak is present, and a leak detection antenna (not shown) can transmit a signal representative of the leak detection data to an external source. In example aspects, the leak detection subsystem 170 can be configured in an operating mode, wherein the leak detection subsystem 170 can be monitoring vibrations (i.e., running a leak detection cycle), and a rest mode, wherein the leak detection subsystem 170 is not monitoring vibrations.

In one aspect, a method for using the pressure monitoring subsystem 110 can comprise measuring the water pressure of water received in the hydrant cavity 484 of the wet barrel hydrant 180, processing the water pressure data to determine whether an anomaly is present, and sending an alert signal when an anomaly is determined to be present. In some aspects, sending an alert signal can comprise sending an alert signal to the leak detection subsystem 170. In other aspects, sending an alert signal can comprise sending an alert signal to a remote operations center, or another third party. Furthermore, according to example aspects, processing the water pressure data can comprise sending the water pressure data measured by the pressure sensor 222 to a PCB (such as the auxiliary PCB 260 and/or main PCB 646), processing the water pressure data with the PCB, and communicating the water pressure data to the antenna 854.

Figure 11:
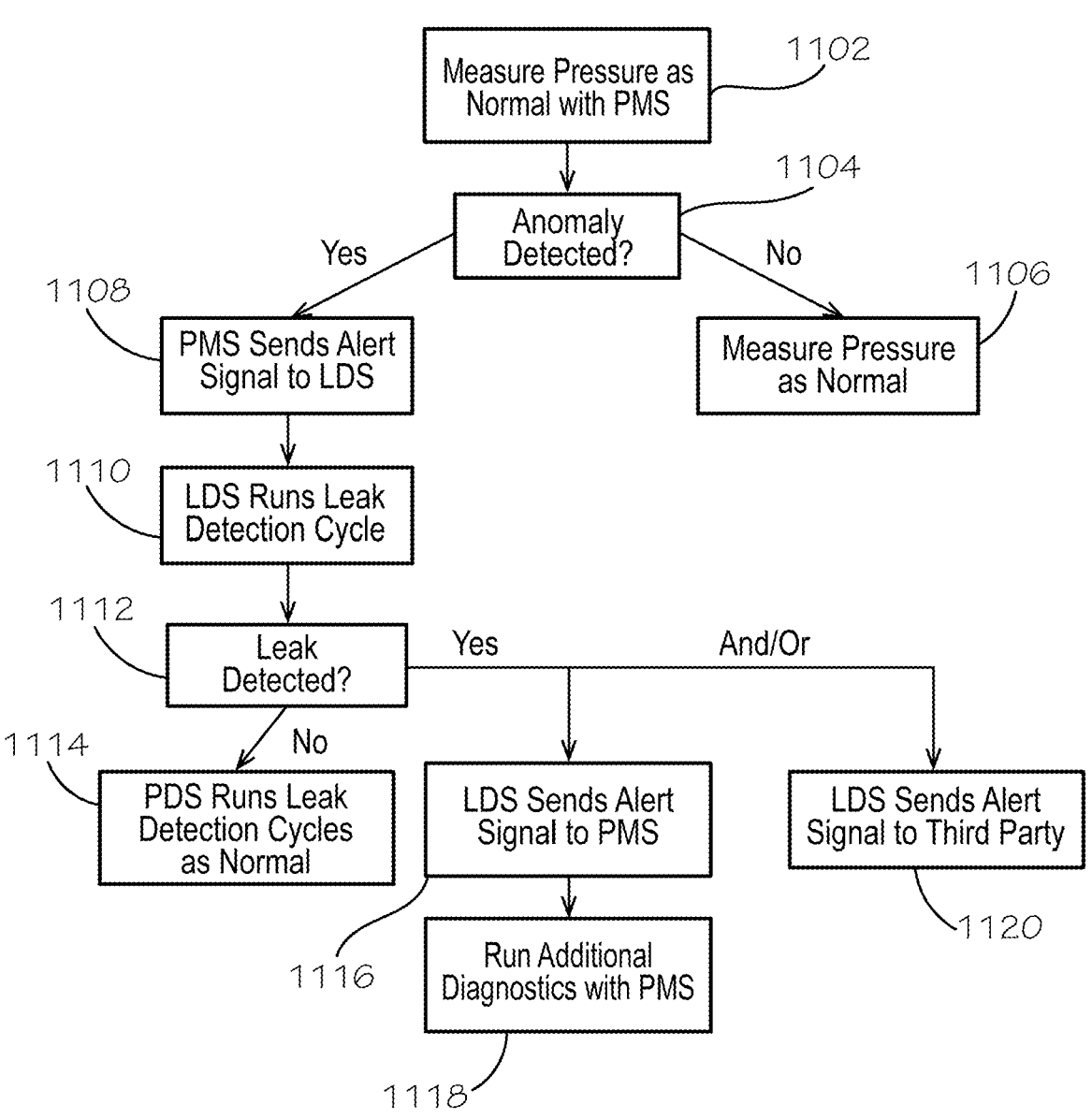
FIG. 11 is a flow diagram illustrating an example process for monitoring water pressure and detecting leaks in a pipeline system, in accordance with one aspect of the present disclosure.

According to example aspects, the pressure monitoring subsystem 110 ("PMS") can transmit signals to the leak detection subsystem 170 ("LDS") and/or the leak detection subsystem 170 can transmit signals to the pressure monitoring subsystem 110. For example, as illustrated in FIG. 11, in one aspect, a method for using the pressure monitoring and leak detection system 100 (shown in FIG. 1) can comprise a first step 1102 of measuring the water pressure of water received in the hydrant cavity 484 (shown in FIG. 4) of a wet barrel hydrant 180 (shown in FIG. 1) with the pressure monitoring subsystem 110 (shown in FIG. 1), and a second step 1104 can comprise processing the water pressure data to determine whether an anomaly is present. If an anomaly is not detected, a third step 1106 can comprise continuing to measure the water pressure as normal. However, if an anomaly is detected, an alternate third step 1108 can comprise alerting the leak detection subsystem 170 (shown in FIG. 1), either directly from the pressure monitoring subsystem 110 or indirectly through a third party, such as a remote operations center operated by a utility company. A fourth step 1110 can comprise running a leak detection cycle with the leak detection subsystem 170 and a fifth step 1112 can comprise processing the leak detection data with the leak detection subsystem 170 or at the remote operations center to determine whether a leak is present. If a leak is not detected, a sixth step 1114 can comprise continuing to run leak detection cycles as regularly scheduled. In another aspect, wherein a pressure anomaly is detected but a possible leak is not detected, an alert signal indicative of these results can be sent to the third party. If a possible leak is detected, an alternate sixth step 1116 can comprise sending an alert signal to the pressure monitoring subsystem 110, and a seventh step 1118 can comprise running additional diagnostics with the pressure monitoring subsystem 110 to further evaluate the possible leak. In some aspects, an eighth step 1120 can comprise also sending an alert signal to a third party, such as the remote operations center, when a possible leak is detected. The eighth step 1120 can be performed in tandem with or after the sixth step 1116, or in some aspects, can be performed instead of the sixth step 1116 and seventh step 1118.

Figure 12:
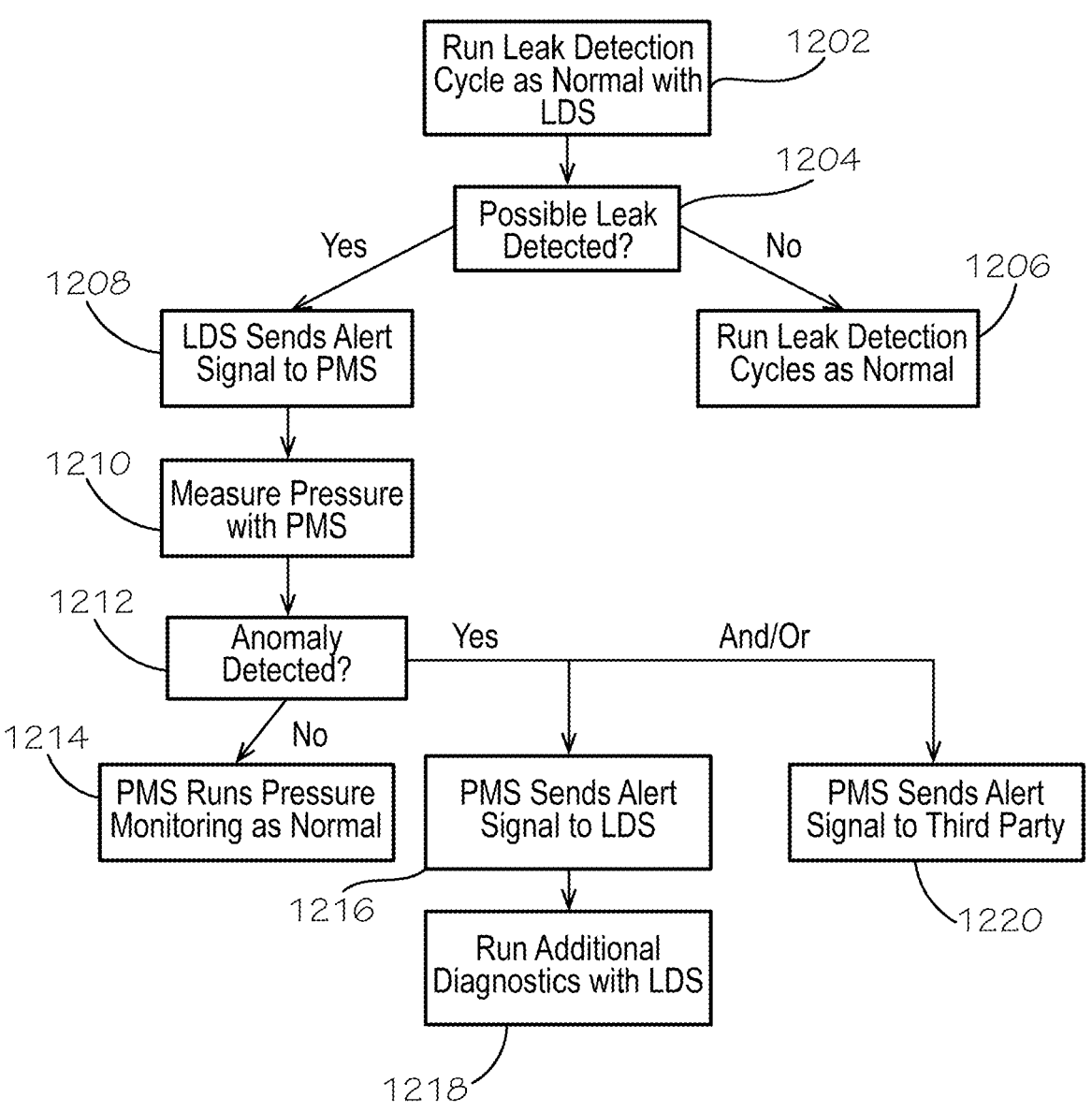
FIG. 12 is a flow diagram illustrating another example process for monitoring water pressure and detecting leaks in a pipeline system, in accordance with another aspect of the present disclosure.

In another aspect, the series of steps described above can be substantially reversed. For example, as shown in FIG. 12, a method for using the pressure monitoring and leak detection system 100 can comprise a first step 1202 of running a leak detection cycle as regularly scheduled with the leak detection subsystem 170 (shown in FIG. 1), and a second step 1204 can comprise processing the leak detection data to determine whether a leak is present. If a leak is not detected, a third step 1206 can comprise continuing to run leak detection cycles as regularly scheduled. However, if a possible leak is detected, an alternate third step 1208 can comprise alerting the pressure monitoring subsystem 110 (shown in FIG. 1) either directly from the leak detection subsystem 170 or indirectly through the third party (e.g., a remote operations center operated by a utility company). A fourth step 1210 can comprise measuring the water pressure of the water within the hydrant cavity 484 (shown in FIG. 4) with the pressure monitoring subsystem 110, and a fifth step 1212 can comprise processing the water pressure data with the pressure monitoring subsystem 110 or at the remote operations center to determine whether an anomaly is present. If an anomaly is not detected, a sixth step 1214 can comprise continuing to measure the water pressure as normal. In another aspect, if a possible leak is detected but a pressure anomaly is not detected, an alert signal indicative of these results can be sent to the third party. If a pressure anomaly is detected, an alternate sixth step 1216 can comprise sending an alert signal to the leak detection subsystem 170, and a seventh step 1218 can comprise running an additional leak detection cycle to further evaluate the possible leak. In some aspects, an eighth step 1220 can comprise also sending an alert signal to a third party, such as a remote operations center, when an anomaly is detected. The eighth step 1220 can be performed in tandem with or after the sixth step 1216, or in some aspects, can be performed instead of the sixth step 1216 and seventh step 1218.

Figure 13A:
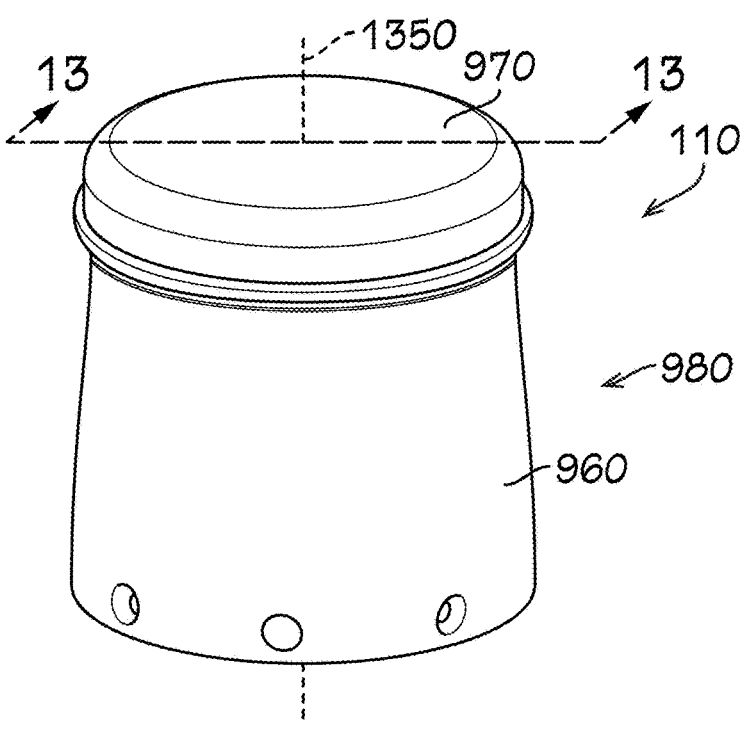
FIG. 13A illustrates a perspective view of the pressure monitoring subsystem, according to another aspect of the present disclosure.
Figure 13B:
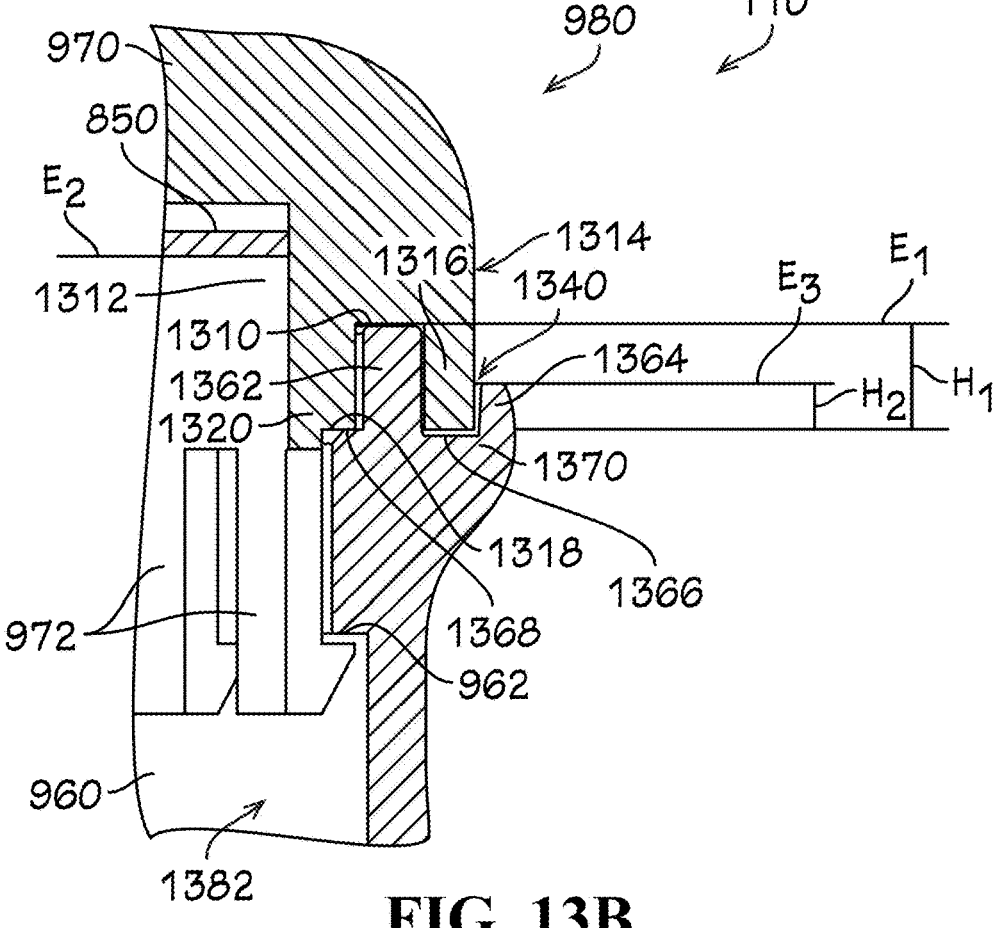
FIG. 13B illustrates a close-up, cross-sectional view of the pressure monitoring subsystem of FIG. 13A taken along line 13-13 in FIG. 13A.

FIG. 13A illustrates the pressure monitoring subsystem 110, according to another aspect of the invention. In other aspects, the pressure monitoring subsystem 110 can be a standalone pressure monitoring system not tied to the leak detection subsystem 170 (shown in FIG. 1) or any other subsystem. As shown, the pressure monitoring subsystem 110 can comprise the sidewall shell 960 and the cap 970. The cap 970 and the sidewall shell 960 can together define the outer housing 980 that can enclose various components of the pressure monitoring subsystem 110. For example, in one aspect, the outer housing 980 can enclose at least the main PCB 646 (shown in FIG. 6) and the antenna 854 (shown in FIG. 8). The sidewall shell 960 can define a sidewall axis 1350 extending centrally therethrough. In example aspects, the sidewall axis 1350 can be substantially co-linear with the center axis 236 (shown in FIG. 2). Referring to FIG. 13B, as described above, the cap 970 can comprise one or more fasteners, such as, for example, the clips 972 for connecting the cap 970 to the sidewall shell 960. As shown, the clips 972 can extend generally vertically downward, relative to the orientation shown, from a bottom end 1320 of cap 970. The clips 972 can be configured to engage a mating fastener of the sidewall shell 960, such as, for example, the interior annular ridge 962, to secure the cap 970 to the sidewall shell 960. In other aspects, any other suitable fastener know in the art can be used, including, but not limited to snaps, adhesives, and the like.

In some aspects, a small gap 1340 can be formed, either intentionally or unintentionally due to, for example, manufacturing tolerances, between the sidewall shell 960 and the cap 970. To prevent the intrusion of water and other undesirable elements through the gap 1340 and into an interior 1382 of the outer housing 980, the sidewall shell 960 can define an annular inner sidewall projection 1362 and annular outer sidewall projection 1364. In the present aspect, each of the inner sidewall projection 1362 and outer sidewall projection 1364 can define a generally rectangular cross-sectional shape. Each of the inner and outer sidewall projections 1362,1364 can extend generally vertically upward, relative to the orientation shown, from a top end 1370 of the sidewall shell 960. In example aspects, the inner sidewall projection 1362 can be elongated as compared to the outer sidewall projection 1364. That is, the inner sidewall projection 1362 can define a height $H_1$ that can be greater than a height $H_2$ of the outer sidewall projection 1364. An annular sidewall recess 1366 can be defined between the inner sidewall projection 1362 and outer sidewall projection 1364, as shown. Furthermore, an annular sidewall mounting ledge 1368 can be defined adjacent the inner sidewall projection 1362 and can extend generally radially inward relative to the sidewall axis 1350.

Example aspects of the cap 970 can comprise an annular cap recess 1310 formed between an inner cap surface 1312 of the cap 970 and an outer cap surface 1314 of the cap 970, as shown. An annular outer cap projection 1316 can be defined between the annular cap recess 1310 and the outer cap surface 1314 of the cap 970, and an annular cap mounting shoulder 1318 can be defined between the annular cap recess 1310 and the clips 972. As shown in FIG. 13B, with the cap 970 mounted on the sidewall shell 960, the cap mounting shoulder 1318 can engage the sidewall mounting ledge 1368. The inner sidewall projection 1362 can engage the annular cap recess 1310, and the outer cap projection 1316 can engage the annular sidewall recess 1366. The outer sidewall projection 1364 can extend generally upward, relative to the orientation shown, alongside the outer cap surface 1314 of the cap 970. As shown, any water (or other undesirable element) that may breach the gap 1340 between the sidewall shell 960 and the cap 970 would have to travel under the outer cap projection 1316 and then travel upwards and over the elongated inner sidewall projection 1362 in order to enter the interior 1382 of the outer housing 980. Additionally, because height $H_1$ is greater than height $H_2$, water cannot travel upwards above inner sidewall projection 1362 because it will overflow over outer sidewall projection 1364 before the water level rises high enough to reach height $H_2$. The configuration of the outer housing 180 can also limit accidental or objectionable disassembly of the outer housing 180, as it would be difficult to wedge a tool (not shown) down through the gap 1340 and underneath the outer cap projection 1316 to separate the cap 970 from the sidewall shell 960. Furthermore, loads applied at or near the joint between the cap 970 and sidewall shell 960 can be spread out across the overlapping projections (e.g., the inner sidewall projection 1362, the outer cap projection 1316, and the outer sidewall projection 1364), which can reduce damage that can be caused by stresses at the joint.

As described above, example aspects of the cap 970 can be formed from a non-ferrous material, so that the material of the cap 970 does not interfere with the ability of the antenna 854 (shown in FIG. 8) to send signals to the third party. In some aspects, the sidewall shell 960 can be formed from a non-ferrous material as well, such as aluminum or plastic. However, in other aspects, the sidewall shell 960 can be formed from a ferrous material, such as a ferrous metal material like stainless steel or iron. In such aspects, the outer housing 980 can be configured such that the sidewall shell 960 can extend vertically to an elevation $E_1$, relative to orientation shown, that can be less than an elevation $E_2$ of the antenna assembly 850, such that the ferrous material of the sidewall shell 960 does not interfere with the signaling ability of the antenna 854. As shown, the inner sidewall projection 1362 can extend to the elevation $E_1$, and the outer sidewall projection 1364 can extend to an elevation $E_3$ lower than the elevation $E_1$.

Figure 14:
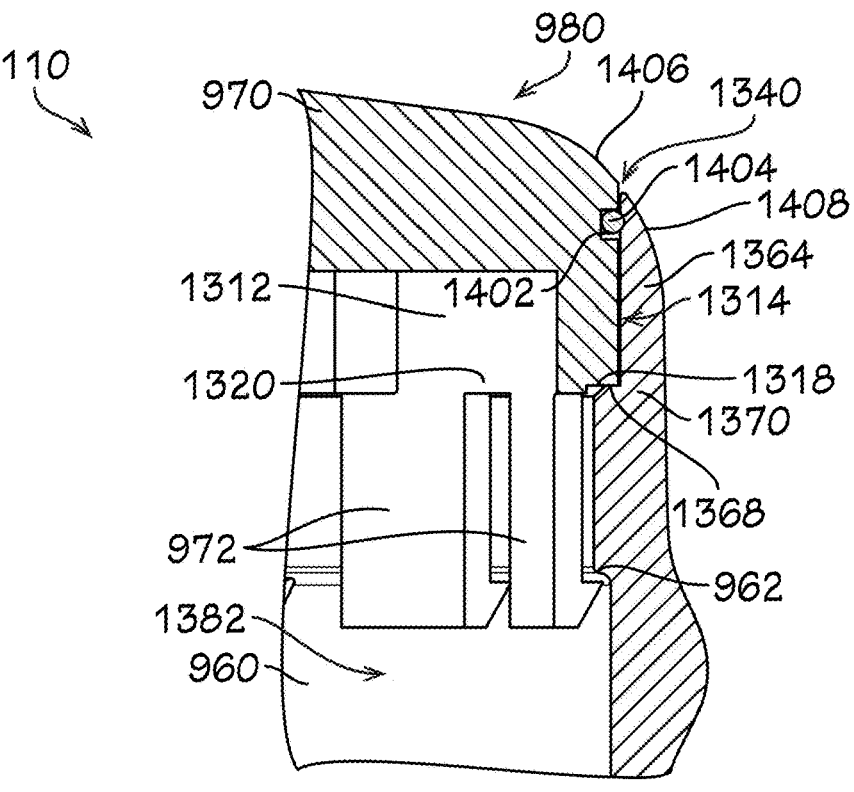
FIG. 14 illustrates a close-up, cross-sectional view of the pressure monitoring subsystem taken along line 13-13 in FIG. 13A, according to another aspect of the present disclosure.

FIG. 14 illustrates another aspect of the outer housing 980 of the pressure monitoring subsystem 110. In the present aspect, the sidewall shell 960 can define the outer sidewall projection 1364 configured to extend alongside the generally annular outer cap surface 1314 of the cap 970. According to example aspects, the outer cap surface 1314 can define an annular notch 1402 formed therein, as shown. A packing, such as, for example, an O-ring 1404, can be received in the annular notch 1402 and can be configured to create a watertight seal between the outer sidewall projection 1364 and the outer cap surface 1314. As such, in instances wherein water (or another undesirable element) may breach the gap 1340 formed between the cap 970 and the sidewall shell 960, the O-ring 1404 can prevent the water from entering the interior 1382 of the outer housing 980. In some aspects, the outer cap surface 1314 can define a curved portion 1406 proximate the gap 1340, and the outer sidewall projection 1364 can define a curved portion 1408 proximate the gap 1340, such that the cap 970 is substantially flush with the sidewall shell 960 at the gap 1340. Furthermore, in the present aspect, the sidewall mounting ledge 1368 can extend radially inward from the outer sidewall projection 1364, and the cap mounting shoulder 1318 can extend radially inward from the outer cap surface 1314 between the outer cap surface 1314 and the clips 972. The cap mounting shoulder 1318 can engage the sidewall mounting ledge 1368, as shown, when the cap 970 is mounted to the sidewall shell 960.

Figure 15:
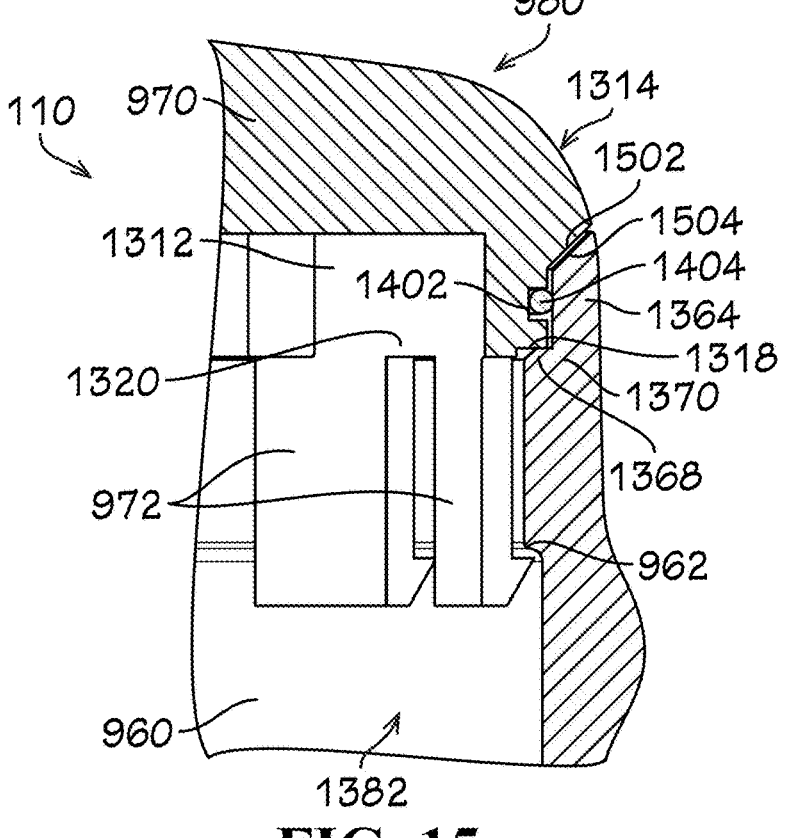
FIG. 15 illustrates a close-up, cross-sectional view of the pressure monitoring subsystem taken along line 13-13 in FIG. 13A, according to another aspect of the present disclosure.

FIG. 15 illustrates another aspect of the outer housing 980 according to the present disclosure. The present aspect of the outer housing 980 can be similar to the aspect of FIG. 14.

However, as shown, the outer cap surface 1314 can define a sloped portion 1502 configured to rest on a sloped top end 1504 of the outer sidewall projection 1364 to further prevent intrusion of water.

Figure 16:
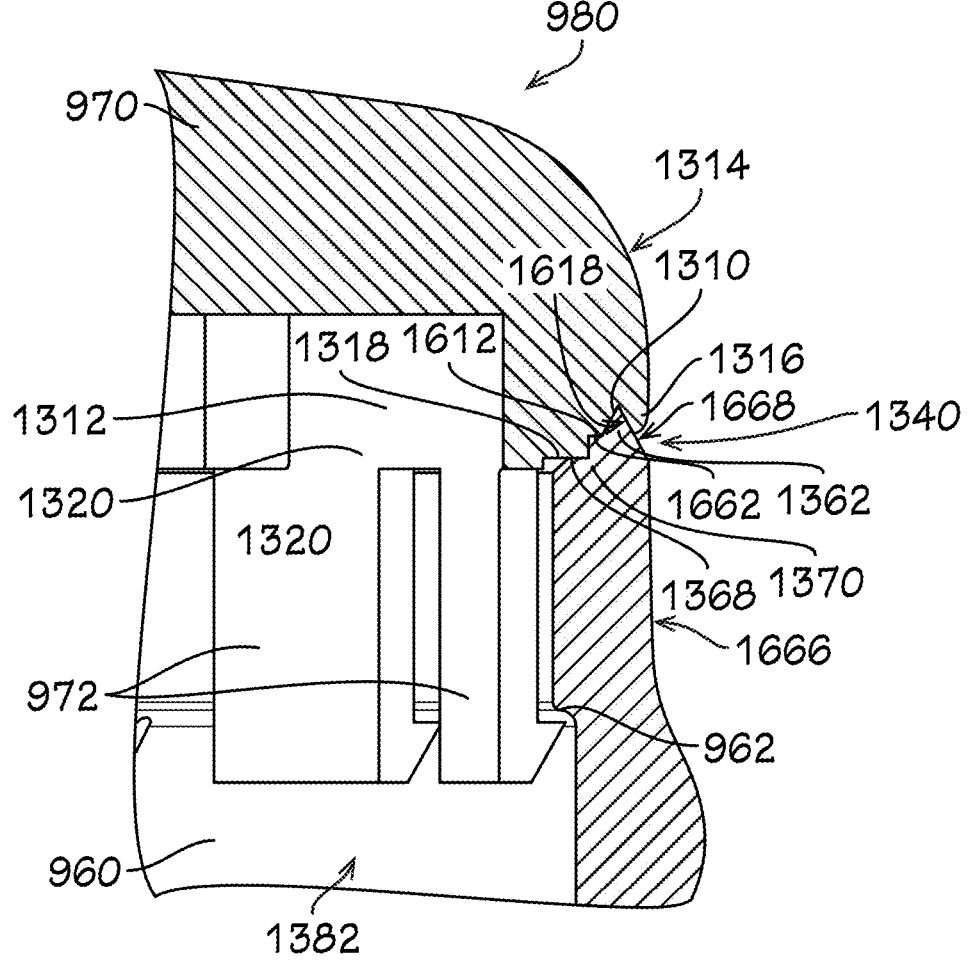
FIG. 16 illustrates a close-up, cross-sectional view of the pressure monitoring subsystem taken along line 13-13 in FIG. 13A, according to another aspect of the present disclosure.

FIG. 16 illustrates still another aspect of the outer housing 980. Similar to the aspect illustrated in FIG. 13B, the outer housing 980 of the present aspect can define the inner sidewall projection 1362 that can engage the cap recess 1310. The inner sidewall projection 1362 can define a generally triangular cross-sectional shape, as shown. As shown, the outer sidewall projection 1364 (shown in FIG. 13B) may not be present. The inner sidewall projection 1362 can define a slanted sidewall projection surface 1668 and the cap recess 1310 can define a confronting slanted cap recess surface 1618. In an instance where water (or another undesirable element) may breach the gap 1340 between the cap 970 and the sidewall shell 960, the water would have to travel up the slanted sidewall projection surface 1668 and over the inner sidewall projection 1362 in order to potentially enter the interior 1382 of the outer housing 980.

According to the present aspect, the cap 970 can also define the outer cap projection 1316 formed between the outer cap surface 1314 and the cap recess 1310. As shown, the outer cap surface 1314 can be substantially flush with an outer sidewall surface 1666 of the sidewall shell 960. The outer housing 980 can also define the cap mounting shoulder 1318 that can engage the sidewall mounting ledge 1368. Example aspects of the cap 970 can further define a second cap mounting shoulder 1612 extending radially between the cap mounting shoulder 1318 and the cap recess 1310. The sidewall shell 960 can further define a second sidewall mounting ledge 1662 extending radially between the sidewall mounting ledge 1368 and the inner sidewall projection 1362. The second cap mounting shoulder 1612 can engage the second sidewall mounting ledge 1662, as shown.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An outer housing for a pressure monitoring system comprising:

a sidewall shell defining an outer shell surface and a top end, the sidewall shell comprising an annular outer sidewall projection extending from the top end, the outer sidewall projection defining at least a portion of the outer shell surface; and a cap mounted to the sidewall shell, the cap defining an inner cap surface and an annular outer cap surface opposite the inner cap surface, the outer sidewall projection extending alongside an outermost portion of the outer cap surface;

wherein the outer cap surface defines a cap curved portion and the outer sidewall projection defines a projection curved portion meeting the cap curved portion, such that the cap is substantially flush with the sidewall shell, and wherein the outermost portion of the outer cap surface is positioned radially-inward of the outer sidewall projection.

2. The outer housing of claim 1, further comprising an antenna assembly directly mounted to the inner cap surface, the antenna assembly comprising an antenna.

3. The outer housing of claim 2, wherein the cap further defines a cap top end and a cap bottom end opposite the cap top end, a cap end wall disposed at the cap top end, the antenna disposed axially between the cap bottom end and the cap end wall.

4. The outer housing of claim 1, wherein;

the sidewall shell defines an annular sidewall mounting ledge extending radially inward from the annular outer sidewall projection;

the cap defines an annular cap mounting shoulder extending radially inward from the annular outer cap surface; and the annular cap mounting shoulder engages the annular sidewall mounting ledge.

5. The outer housing of claim 4, wherein:

the cap comprises a clip extending into an interior shell cavity of the sidewall shell;

the sidewall shell further defines an inner shell surface;

the inner shell surface defines a ridge; and the clip engages the ridge to couple the cap to the sidewall shell.

6. The outer housing of claim 5, wherein:

the ridge is a substantially annular ridge; and the clip is one of a plurality of clips spaced about a circumference of the cap; and each of the plurality of clips engages the substantially annular ridge to couple the cap to the sidewall shell.

7. The outer housing of claim 1, wherein the annular outer cap surface defines an annular notch, and wherein a packing received within the annular notch to create a watertight seal between the annular outer sidewall projection and the annular outer cap surface.

8. The outer housing of claim 1, further comprising a pressure sensor disposed within an interior housing cavity defined by the outer housing.

* * * * *